US012770156B2

(12) United States Patent
Chen

(10) Patent No.: US 12,770,156 B2
(45) Date of Patent: Oct. 20, 2026

(54) METHOD AND DEVICE FOR AUTHENTICATING A VISUAL ITEM

(71) Applicant: SICPA HOLDING SA, Prilly (CH)

(72) Inventor: Cheng Chen, Sion (CH)

(73) Assignee: SICPA HOLDING SA, Prilly (CH)

( * ) Notice: Subject to any disclaimer, the term of this patent is extended or adjusted under 35 U.S.C. 154(b) by 227 days.

(21) Appl. No.: 18/723,712

(22) PCT Filed: Dec. 16, 2022

(86) PCT No.: PCT/EP2022/086374
§ 371 (c)(1),
(2) Date: Jun. 24, 2024

(87) PCT Pub. No.: WO2023/117767
PCT Pub. Date: Jun. 29, 2023

(65) Prior Publication Data

US 2025/0061470 A1 Feb. 20, 2025

(30) Foreign Application Priority Data

Dec. 23, 2021 (EP) .................................... 21217643

(51) Int. Cl.
*G06K 9/00* (2022.01)
*G06Q 30/018* (2023.01)

(52) U.S. Cl.
CPC ................................ *G06Q 30/0185* (2013.01)

(58) Field of Classification Search
CPC .. G06Q 30/0185; G07D 7/2016; G07D 7/206; G07D 7/2008
See application file for complete search history.

(56) References Cited

U.S. PATENT DOCUMENTS

| | | | | |
|---|---|---|---|---|
| 11,830,003 | B2 * | 11/2023 | Withrow | G06F 21/64 |
| 2004/0247169 | A1 | 12/2004 | Ross et al. | |
| 2004/0263911 | A1 | 12/2004 | Rodriguez et al. | |
| 2008/0123931 | A1 | 5/2008 | He et al. | |

FOREIGN PATENT DOCUMENTS

| | | | | |
|---|---|---|---|---|
| CN | 109214246 A | * | 1/2019 | G06F 18/23213 |

OTHER PUBLICATIONS

International Search Report and Written Opinion issued with respect to Application No. PCT/EP2022/086374.

* cited by examiner

*Primary Examiner* — Xin Jia
(74) *Attorney, Agent, or Firm* — MUNCY, GEISSLER, OLDS & LOWE, P.C.

(57) ABSTRACT

The present invention relates to the technical field of optical detection of the authenticity or non-authenticity of visual items Particularly, the invention relates to the technical field of respectively encryption methods and authentication methods of a digital representation of a visual item using respectively an encryption device and an authentication device.

14 Claims, 9 Drawing Sheets

| | | | | | |
|---|---|---|---|---|---|
| *1* | *2* | *5* | *10* | *17* | ... |
| *4* | *3* | *6* | *11* | *18* | |
| *9* | *8* | *7* | *12* | ... | |
| *16* | *15* | *14* | *13* | ... | |
| ... | ... | ... | ... | ... | |
| ... | | | | | |

METHOD AND DEVICE FOR AUTHENTICATING A VISUAL ITEM

TECHNICAL FIELD

The present invention relates to the technical field of optical detection of the authenticity or non-authenticity of visual items. Particularly, the invention relates to the technical field of respectively encryption methods and authentication methods of a digital representation of a visual item using respectively an encryption device and an authentication device.

BACKGROUND OF THE INVENTION

The problems of tampering documents or items of value are well known and are growing every day. For example, value documents such as ID card, passport, driving license, etc. usually contains a photo of the holder and a part with text based on personal information such as name, date of birth, etc. For this kind of documents, several techniques can be used to tamper them.

Indeed, in some situation the tampering can comprise a replacement of the visual item, for example the picture on an ID card. This substitution can imply only few modifications such as using a morphing process or can be a complete replacement of the picture. All these techniques can be very difficult to be detected by naked eye. Indeed, in case of human eyes, the replacement of the picture can be undetectable, and in case of a machine optical reader the morphing technique can be quite effective.

Regarding these technical problems, several solutions have been proposed by the prior art. The most used ones comprise material-based security features. These material-based security features can be based on security inks, for example.

Nevertheless, these solutions often imply to physically add features on the visual item or at least on the medium carrying said visual item, i.e. on the value document. This can lead to design problem or to an increase of the price to produce said value document. Moreover, some supply chain modification can be required.

Beyond the field of the value documents, the tampering of other kinds of visual items is also a problem. For example, paintings or collectible cards can be targeted. In this case, using material-based security features is still a solution. However, this solution can be expensive and cannot be implemented directly on the visual item itself in some situations.

Moreover, usually the use of material-based security features implies the use of dedicated reader devices configured to evaluate if the value document has been tampered or not. These dedicated reader devices are also costly and cannot be always owned by the final customer, for example.

It is therefore an object of the invention to solve at least partially some of these technical problems.

SUMMARY OF THE INVENTION

According to an aspect, the present invention relates to a method for authenticating a visual item VI using a stored digital fingerprint $F_0$ and an authentication device AD, said authentication device AD comprising at least one optical unit OPT1 and at least one processing unit CPU1, said stored digital fingerprint $F_0$ being previously generated from an authentic visual item AVI, said method comprising the following steps:

a. acquiring, using said optical unit OPT1, at least a plurality of images I of an area comprising the visual item VI to be authenticated, said optical unit OPT1 being in communication with said processing unit CPU1, each image $I_t$ of the plurality of images I comprising at least partially one digital representation of said visual item VI, the image $I_t$ being acquired at a time t; and b. for each image $I_t$ of the plurality of images I, generating, by said processing unit CPU1, a spatially corrected image $Ic_t$ by correcting the image $I_t$ based on at least one spatial feature to calibrate the at least partially one digital representation of said visual item VI (50) to be in a same perspective as that of said authentic visual item AVI (10), creating a plurality of spatially corrected images Ic; and c. for each spatially corrected image $Ic_t$ of the plurality of spatially corrected images Ic:

i. extracting, by said processing unit CPU1, a plurality of features; and ii. generating, by said processing unit CPU1, a digital fingerprint $F_t$ of the digital representation of the visual item VI from the spatially corrected image lot using at least a portion of said extracted plurality of features; and iii. calculating, by said processing unit CPU1, at least one distance metric $D(Ic_t|H)$ between said digital fingerprint $F_t$ and said stored digital fingerprint $F_0$, and iv. calculating, by said processing unit CPU1, a first likelihood function $L(Ic_t|H)$ of authenticity H of the visual item VI from its digital representation from the spatially corrected image $Ic_t$ based on said calculated distance metric $D(Ic_t)$ and a second likelihood function $L(Ic_t|G)$ of non-authenticity G of the visual item VI from its digital representation from the spatially corrected image $Ic_t$ based on said calculated distance metric $D(Ic_t)$; and v. computing, by said processing unit CPU1, a probability P(H) that the visual item VI is authentic using the first likelihood function $L(Ic_t|H)$ and the second likelihood function $L(Ic_t|G)$; and wherein the probability P(H) is updated as each spatially corrected image lot of the plurality of spatially corrected images is processed, and the authentication of the visual item VI is confirmed, by said processing unit CPU1, if the probability P(H) is greater than a predetermined threshold.

The present invention allows to detect the authenticity of a visual item based on a stored digital fingerprint. The present invention allows to authenticate a visual item based on a plurality of images of said visual item and on a stored digital fingerprint.

The present invention can be used regarding any kind of visual item.

The present invention uses advantageously likelihood functions to update a probability of authenticity, said update being based on each new image of the visual item that is processed by the invention.

The present invention allows to use a plurality of images of a visual item to compute the probability of authenticity of said visual item based on a stored digital fingerprint.

Advantageously, each new processed image of the visual item updates the probability of authenticity.

The present invention avoids the need of material-based security features to help a user to know if a visual item is authentic or not. Only some images of a visual item and a stored digital fingerprint of the authentic visual item are needed to confirm if the considered visual item is authentic or not According to another aspect, the present invention relates to an authentication device AD configured to authenticate a visual item VI using a stored digital fingerprint $F_0$, said stored digital signature $F_0$ being previously generated from an authentic visual item VI, said authentication device AD comprising:

a. an optical unit OPT1 configured to acquire at least a plurality of images I of an area comprising the visual item VI to be authenticated, each image $I_t$ of the plurality of images I comprising at least partially one digital representation of said visual item VI, the image $I_t$ being acquired at a time t; and
b. a processing unit CPU1 configured to:
   i. for each image $I_t$ of the plurality of images I, generate a spatially corrected image $Ic_t$ by correcting the image $I_t$ based on at least one spatial feature to calibrate the at least partially one digital representation of said visual item VI (50) to be in a same perspective as that of said authentic visual item AVI (10), creating a plurality of spatially corrected images $Ic_t$; and
   ii. for each spatially corrected image $Ic_t$ of the plurality of spatially corrected images Ic:
      (1) extract a plurality of features; and
      (2) generate a digital fingerprint $F_t$ of the digital representation of the visual item VI from the spatially corrected image $Ic_t$ using at least a portion of said extracted plurality of features; and
      (3) calculate at least one distance metric $D(Ic_t)$ between said digital fingerprint Ft and said stored digital fingerprint $F_0$; and
      (4) calculate a first likelihood function $L(Ic_t|H)$ of authenticity H of the visual item VI from its digital representation from the spatially corrected image $Ic_t$ based on said calculated distance metric $D(Ic_t)$ and a second likelihood function $L(Ic_t|G)$ of non-authenticity G of the visual item VI from its digital representation from the spatially corrected image $Ic_t$ based on said calculated distance metric $D(Ic_t)$; and
      (5) compute a probability P(H) that the visual item VI is authentic using the first likelihood function $L(Ic_t|H)$ and the second likelihood function $L(Ic_t|G)$, the probability P(H) being updated as each spatially corrected image $Ic_t$ of the plurality of spatially corrected images is processed; and
      (6) confirm that the visual item VI is authentic if the probability P(H) is greater than a predetermined threshold.

This allows a user to check the authenticity of a visual item using the present invention.

According to another aspect, the present invention relates to a digital fingerprint generation device GD configured to generate a digital signature $F_0$ from an authentic visual item AVI, said digital fingerprint $F_0$ being configured to be stored, said digital signature generator device GD comprising:

a. an optical unit OPT2 configured to acquire at least one image I of the authentic visual item AVI and/or a download unit configured to download at least one image I of the authentic visual item AVI from at least one server; and
b. a processing unit CPU2 configured to:
   i. preferably, generate a spatially corrected image Ic by correcting the image I based on at least one spatial feature; and
   ii. extract a plurality of features from said image I and/or preferably from said spatially corrected image Ic; and
   iii. generate the digital fingerprint $F_0$ of the digital representation of the authentic visual item VI from the image I, and/or preferably from the spatially corrected image Ic, using at least a portion of said extracted plurality of features; and
c. preferably, a storage unit SU2 configured to store the digital fingerprint $F_0$ in at least one of the following forms: a QR code, a data matrix, a barcode, a serial number, a watermark, a digital watermark, a metadata, a data stored in a memory, a data stored in a server.

This allows to generate a digital fingerprint from an authentic visual item using only one image.

Before providing below a detailed review of embodiments of the invention, some optional characteristics that may be used in association or alternatively will be listed hereinafter:

According to an example, the computing step of the probability P(H) comprises the following steps:

a. setting, by the processing unit CPU1, a prior probability $P_0(H)$ based on a predetermined set of rules, and
b. for each spatially corrected image $Ic_t$, calculating, by the processing unit CPU1, a posterior probability $P_t(H)$ as follow:

$$P_t(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

and c. calculating, by the processing unit CPU1, the probability P(H) by computing a weighted moving average as follow.

$$P(H) = \frac{\sum_{i=0}^{w} \gamma_i P_{t-i}(H)}{\sum_{i=0}^{w} \gamma_i}$$

wherein w is the number of spatially corrected image $Ic_t$ of the plurality of spatially corrected image Ic and $\{Y_i\}$(i=0, . . . w) are predetermined weights.

This allows to compute the probability P(H) of authenticity based on each new corrected image $Ic_t$.

This allows to compute the probability P(H) from a prior probability $P_0(H)$, said prior probability $P_0(H)$ is updated using each new corrected image $Ic_t$ through the first and the second likelihood functions.

Each update applied to the probability P(H) is advantageously weighted, this allows to vary the impact of a corrected image $Ic_t$ for example based on a quality score.

According to an example, the probability P(H) is computed from a probability distribution p(P(H)) and P(H) is related to at least one descriptive statistics of the probability distribution p(P(H)), and preferably P(H) is a mathematical expectation of p(P(H)) as follow:

$$P(H) = \int_0^1 p(y) y \, dy$$

Using a probability distribution allows to calculate more descriptive statistics for P(H).

According to an embodiment, this allows to calculate a confidence interval. This confidence interval can be used to make better decision than only a point-based probability estimate P(H), because using a probability distribution p(P(H)) allows to have the probability P(H) and an uncertainty of this probability P(H). Preferably, the confidence interval can be calculated using percentiles. For example, the 90% confidence interval of P(H) is between the 5% th and 95% th percentile of the probability distribution p(P(H).

According to an embodiment, the computing step of the probability P(H) comprises the following steps:

a. setting, by the processing unit CPU1, a prior probability distribution $p_0(P(H))$ based on a predetermined set of rules, and
b. sampling, by the processing unit CPU1, K independent prior probability values $\{P_{0,1}, \ldots, P_{0,K}\}$ from the prior probability distribution $p_0(P(H))$; and
c. using each of these K prior probabilities $\{P_{0,k}\}_{k=1 \ldots K}$, calculating, by the processing unit CPU1 (42), K posterior probabilities $\{P_{t,x}(H)\}_{k=1 \ldots K}$ as follow.

$$P_{t,k}(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

and d. using the K posterior probabilities $\{_{t,x}(H)\}_{k=1 \ldots K}$ fitting, by the processing unit CPU1, a new posterior probability distribution $p_t$ (P(H)), and
e. calculating, by the processing unit CPU1, the probability distribution p(P(H)) by computing a weighted moving average as follow $$p(P(H)) = \frac{\sum_{i=0}^{w} \alpha_i p_{t-i}(P(H))}{\sum_{i=0}^{w} \alpha_i}$$

wherein w is the number of spatially corrected image $Ic_t$ of the plurality of spatially corrected image Ic and $\{\alpha_i\}$ (i=0, . . . w) are predetermined weights.

This allows to compute the probability P(H) of authenticity based on each new corrected image $Ic_t$.

This allows to compute a probability distribution p(P(H)) from a prior probability distribution $p_0(P(H))$, said prior probability distribution $p_0(P(H))$ is updated using each new corrected image $Ic_t$ through the first and the second likelihood functions.

Each update applied to the probability distribution p(P(H)) is advantageously weighted, this allows to vary the impact of a corrected image $Ic_t$ for example based on a quality score.

According to an example, the calculating step of the first likelihood function $L(Ic_t|H)$ based on the distance metric $D(Ic_t)$ comprises the following steps:

a. fitting, by the processing unit CPU1, a probability distribution or probability density function PD1 with respect to a distance metric D(SD1) from at least one set of training data SD1, said training data SD1 corresponding to authentic visual items, and
b. for each image $Ic_t$, calculating, by the processing unit CPU1, the first likelihood function $L(Ic_t|H)$ as a probability or probability density given by PD1 at the distance metric $D(Ic_t)$;

and, the calculating step of the second likelihood function $L(Ic_t|G)$ based on the distance metric $D(Ic_t)$ comprises the following steps:

c. fitting, by the processing unit CPU1, a probability distribution or probability density function PD2 of a distance metric D(SD2) from at least one set of training data SD2, said training data SD2 corresponding to non-authentic visual items; and
d. for each image $Ic_t$, calculating, by the processing unit CPU1, the second likelihood function $L(Ic_t|G)$ as a probability or probability density given by PD2 at the distance metric $D(Ic_t)$.

This allows to improve the computation of the probability P(H) by calculating the first and the second likelihood function based on the distance metric.

According to an example, the calculating step of the first likelihood function $L(Ic_t|H)$ based on the distance metric $D(Ic_t)$ comprises the following steps:

a. fitting, by the processing unit CPU1, a probability distribution PD1 of a distance metric D(PD1) from at least one set of training data SD1, said training data SD1 corresponding to authentic visual items; and
b. for each image $Ic_t$, calculating, by the processing unit CPU1, the first likelihood function $L(Ic_t|H)$ as probability density given by PD1 at the distance metric $D(Ic_t)$;

and, the calculating step of the second likelihood function $L(Ic_t|(G)$ based on the distance metric $D(Ic_t)$ comprises the following steps:

c. fitting, by the processing unit CPU1, a probability distribution PD2 of a distance metric D(PD2) from at least one set of training data SD2, said training data SD2 corresponding to non-authentic visual items; and
d. for each image $Ic_t$, calculating, by the processing unit CPU1, the second likelihood function $L(Ic_t|G)$ as probability density given by PD2 at the distance metric $D(Ic_t)$.

This allows to improve the computation of the probability distribution p(P(H)) by calculating the first and the second likelihood function based on the distance metric.

According to an example, the first likelihood function $L(Ic_t|H)$ is at least partially generated by an artificial intelligence algorithm A1 using at least one set of training data SD1, said first likelihood function $L(Ic_t|H)$ comprising at least a sub-function SF1 defined by a density of probabilities that the visual item VI is authentic, said sub-function SF1 being generated by the artificial intelligence algorithm A1 using said training data SD1, said training data SD1 corresponding to authentic visual items, said first sub-function SF1 corresponding to a mathematical model of authentic visual items;

and the second likelihood function $L(Ic_t|G)$ is at least partially generated by an artificial intelligence algorithm A1' using at least one set of training data SD2, said second likelihood function $L(Ic_t|G)$ comprising at least a sub-function SF2 defined by a density of probabilities that the visual item VI is non-authentic, said sub-function SF2 being generated by the artificial intelligence algorithm A1' using said training data SD2, said training data SD2 corresponding to non-authentic visual items, said sub-function SF2 corresponding to a mathematical model of non-authentic visual items.

Using an artificial intelligence algorithm allows to train the present invention to optimize the first and the second likelihood function.

This allows to adapt the first and the second likelihood function by training to different situations.

According to an example, the visual item VI is carried by a medium ME and the first likelihood function $L(Ic_t|H)$ is at least partially generated using an artificial intelligence algorithm A2 configured to generate at least one linear combination of mathematical models of media for each spatially corrected image $Ic_t$ based on at least a plurality of mathematical models of media, and the second likelihood function $L(Ic_t|G)$ is at least partially generated using an artificial intelligence algorithm A2' configured to generate at least one linear combination of mathematical models of media for each spatially corrected image $Ic_t$ based on at least a plurality of mathematical models of media.

This allows to consider the nature of the medium in the calculations of the present invention.

This allows to extract some features from the medium and then to classify this medium based on training data.

According to an example, the artificial intelligence algorithms A2 and A2' comprise the following steps:

a. extracting, by the processing unit CPU1, local binary patterns feature vectors at pixels among a plurality of pixels of each spatially corrected image $Ic_t$ of the plurality of spatially corrected images I; and b. calculating, by the processing unit CPU1, the histogram of the local binary patterns features vectors throughout at least a portion of each spatially corrected image $Ic_t$ of the plurality of spatially corrected images Ic; and c. training, by the processing unit CPU1, a classifier which outputs the medium from the local binary patterns feature vectors based on a plurality of mathematical models of media; and d. using said classifier, generating, by the processing unit CPU1, at least one probability for each mathematical model of media of the plurality of mathematical models for each spatially corrected image $Ic_t$ of the plurality of spatially corrected images Ic that the visual item VI is carried by a certain kind of media; and e. generating, by the processing unit CPU1, at least one linear combination of mathematical models of said media for the spatially corrected image $Ic_t$.

This allows to consider the nature of the medium in the calculations of the present invention.

This allows to extract some features from the medium and then to classify this medium based on training data.

This allows to improve the accuracy of the invention based on the nature of the medium.

According to an example, the method comprises, before the step of extracting the plurality of features from a spatially corrected image $Ic_t$ of the plurality of spatially corrected images Ic, a step of calculating, by the processing unit CPU1, a quality score of each image $Ic_t$ of the plurality of spatially corrected images Ic, and only if said quality score is higher than a predetermined threshold, the step of extracting from said image $Ic_t$ the plurality of features is executed.

This allows to class the corrected images based on their quality score.

This allows to eliminate corrected images having a bad quality score for example.

This allows to promote corrected images having a good quality score for example.

This allows to weight the probability $P_t(H)$ and/or the probability distribution $p_t(P(H))$ in the computation step of the probability P(H).

According to an example, the distance metric $D(Ic_t)$ is calculated using a matrix Q as a mathematical operator between the stored digital fingerprint $F_0$ and the digital fingerprint $F_t$, said matrix Q is generated using an artificial intelligence algorithm A3, said artificial intelligence algorithm A3 is configured to generate said matrix Q based at least two sets of training data SD3 and SD4 such as:

a. the matrix Q maximizes the distance metric $D(Ic_t)$ using said training data SD3, said training data SD3 corresponding to authentic visual items; and b. the matrix Q minimizes the distance metric $D(Ic_t)$ using said training data SD4, said training data SD4 corresponding to non-authentic visual items.

This allows to consider complex interactions when calculating the distance metric $D(Ic_t)$ between the generated fingerprint $F_t$ and the stored digital fingerprint $F_0$.

According to an example, the predetermined set of rules are established based on an artificial intelligence algorithm A4 configured to generate respectively a prior probability $P_0(H)$ or a prior probability distribution $p_0(P(H))$ based on at least one of these parameters:

a. a reputation score based on the nature of the visual item, and/or the location of the visual item and/or on metadata related to the visual item and/or an issuer of the visual item and/or an issuer of a medium carrying the visual item, a uniform law of distribution, and/or based on at least one of the following processes:

b. a decision tree; and c. forests consisting of decision trees.

This allows to consider various parameters to set the predetermined set of rules.

According to an example, the stored digital fingerprint $F_0$ comprises a vector $V_0$ comprising a predetermined number N of elements, and the digital fingerprint $F_t$ comprises a vector $V_t$ comprising a number M of elements, wherein $M \leq N$ and wherein M is a function of the quality score of the spatially corrected image $Ic_t$.

This allows to adapt the calculation of the distance metric $D(Ic_t)$ based on the length of the generated digital fingerprint $F_t$.

This allows to adapt the calculation of the distance metric $D(Ic_t)$ based for example on the quality of the corrected image $Ic_t$.

BRIEF DESCRIPTION OF THE DRAWINGS

The aims, objects, as well as the technical features and advantages of the invention will emerge better from the detailed description of an embodiment of the invention which is illustrated by the following figures in which.

Figure 1:
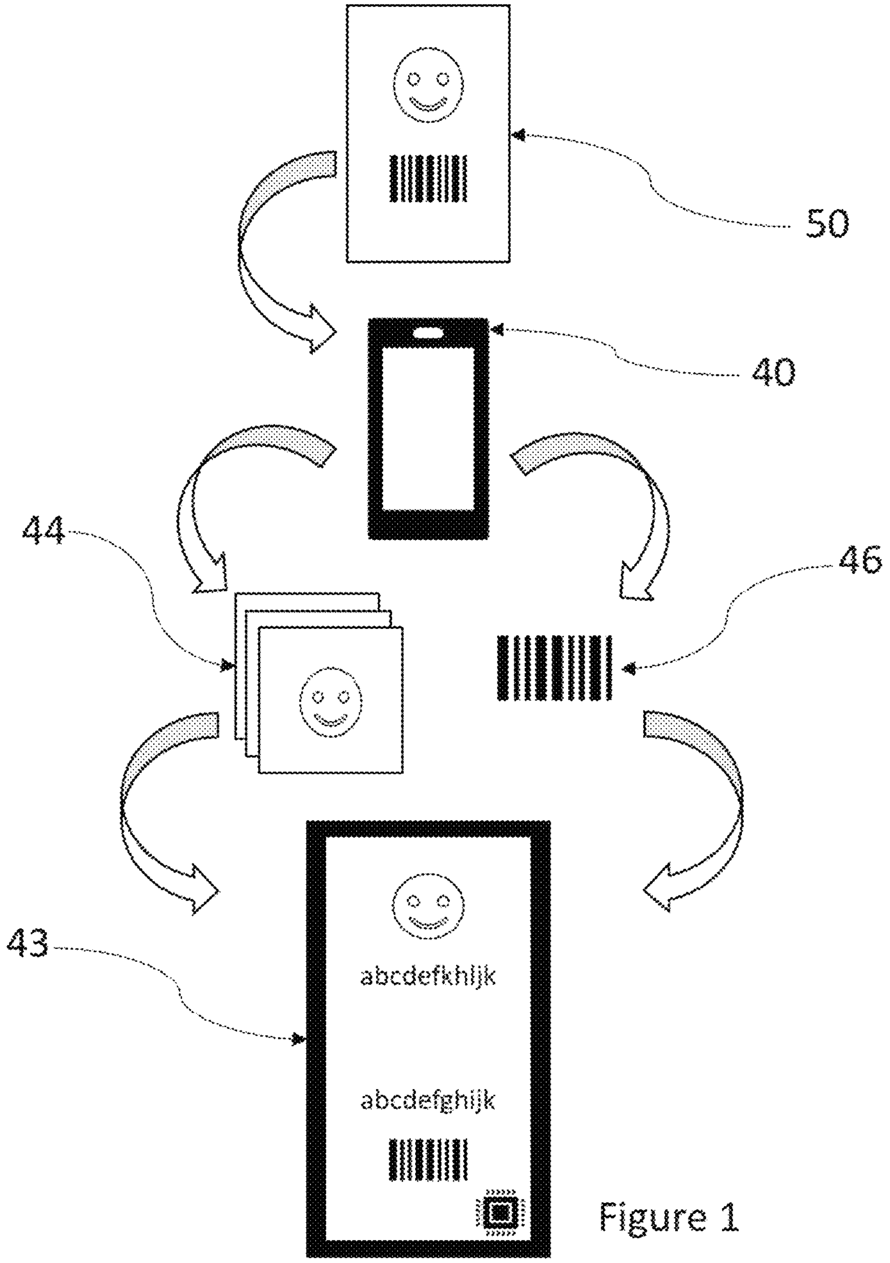
FIG. 1 is a general schematic view of an authentication method according to an embodiment of the present invention.

The drawings are given by way of example and do not limit the invention. They constitute representations of principle intended to facilitate understanding of the invention and are not necessarily on the scale of practical applications.

DETAILED DESCRIPTION

The present disclosure is here described in detail with reference to non-limiting embodiments illustrated in the drawings.

The present invention relates to a method for authenticating a visual item using a stored digital fingerprint. Said stored digital fingerprint has been previously generated according to a digital fingerprint generation method described hereafter. Said stored digital fingerprint is generated from an authentic visual item. Said stored digital fingerprint is advantageously generated by an issuer, preferably an official issuer, accredited to issue a stored digital fingerprint, i.e. to establish the authenticity of an authentic visual item. For example, said issuer can be a governmental agency or a public administration, etc.

The present invention relates to a solution to check if a visual item is authentic or not. To do so, a digital fingerprint is generated from the visual item to be authenticated and is compared with the stored digital fingerprint coming from the authentic visual item, preferably issued by an official and/or accredited issuer.

According to an embodiment, and as described hereafter, the issuer of the stored digital fingerprint can use a digital fingerprint generation device to generate said stored digital fingerprint.

According to an embodiment, and as described hereafter, a user or a controller or an inspector can use an authentication device to authenticate if a visual item is authentic or not using on said stored digital fingerprint.

The present invention can be used in a lot of different cases. Some of them are described in detail hereafter. One of these cases can be a value document, such as an ID card, comprising the picture of the owner of said ID card and a stored digital fingerprint corresponding to the digital fingerprint of the picture of the owner of the ID card, said digital fingerprint, also called stored digital fingerprint, having been generated by the official issuer of said ID card.

According to an embodiment, in order to authenticate the ID card of a person, a user uses an authentication device to extract the stored digital fingerprint and to generate a digital fingerprint by itself from the picture carried by the ID card. Then, the generated digital fingerprint is compared to the stored digital fingerprint to notify the user that the picture carried by the ID card is authentic or not. According to an embodiment, the authentication device is configured to execute an authentication method comprising several steps in order to compare a generated digital fingerprint with said stored digital fingerprint. As described hereafter, the visual item can be taken among several items, such as a value document, an identity photo, a painting, a collectible card, etc.

The present invention is described hereafter using FIGS. 1 to 13 as schematic illustrations of some of the embodiments of the present invention.

The Authentication Method

According to an embodiment, the present invention relates to a method for authenticating 200 a visual item VI 50. Said authentication method 200 uses at least stored digital fingerprint $F_0$ 11. Said authentication method 200 is executed by an authentication device AD 40 described in FIG. 3.

As described hereafter, said authentication device AD 40 comprises at least:

a. one optical unit OPT1 41, and b. one processing unit CPU1 42.

Advantageously, said processing unit CPU1 42 and said optical unit OPT1 41 are in communication with each other, i.e. data can be sent by the optical unit OPT1 41 to the processing unit CPU1 42 and/or data can be sent by the processing unit CPU1 42 to the optical unit OPT1 41.

According to an embodiment, said optical unit OPT1 41 can be a camera, a camera system, an optical sensor, a matrix of optical sensors, a network of optical sensors, etc.

According to an embodiment, said authentication device AD 40 can be a smartphone, a computer, a laptop, a dedicated reader, etc.

Figure 4:
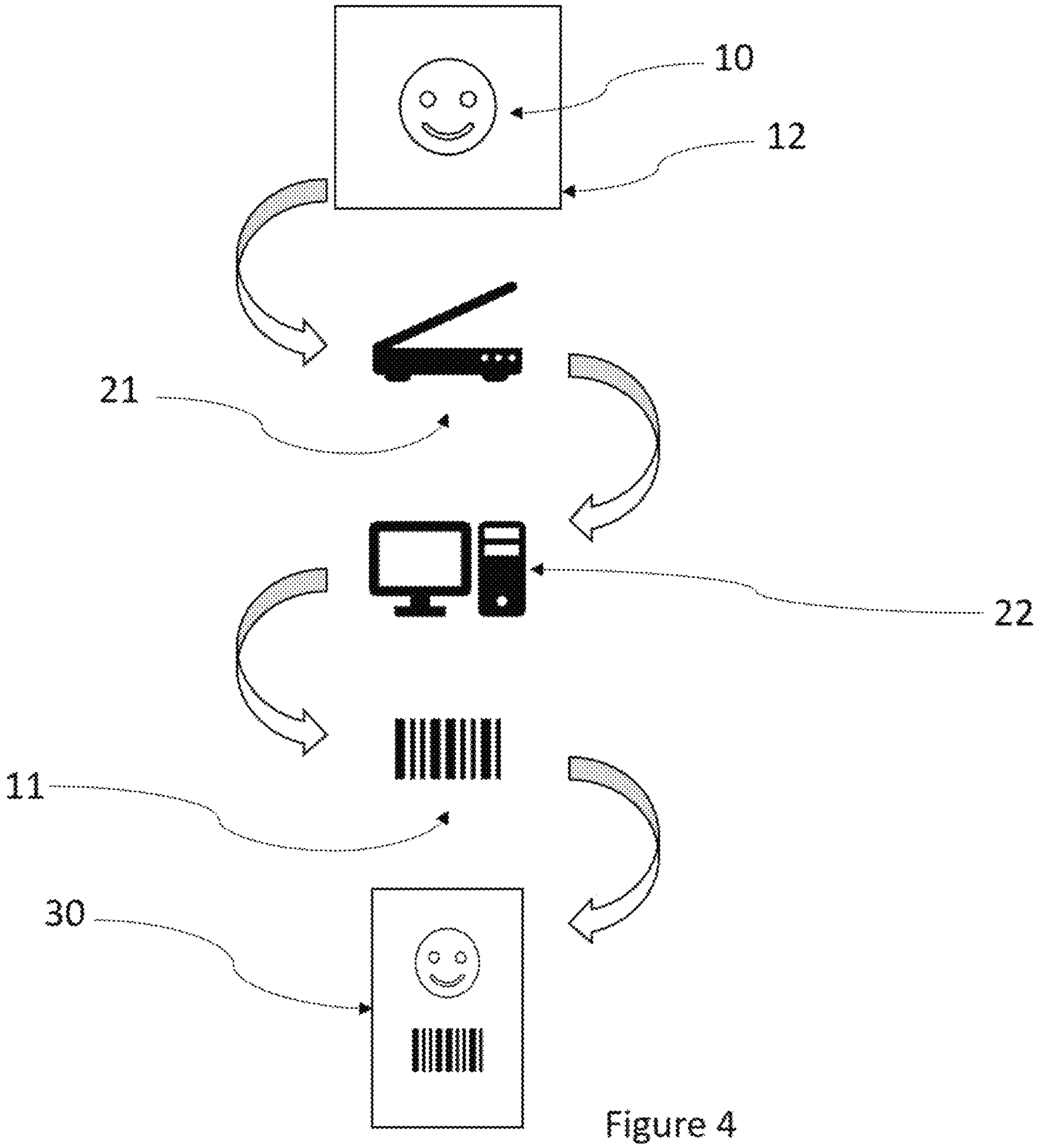
FIG. 4 is a general schematic view of a digital fingerprint generation method according to an embodiment of the present invention.

As previously described, and as illustrated by FIG. 4 for example, said stored digital fingerprint $F_0$ 11 has been previously generated from an authentic visual item AV! 10, preferably using a digital fingerprint generation device GD 20, advantageously using a digital fingerprint generation method 100 described hereafter.

Figure 2:
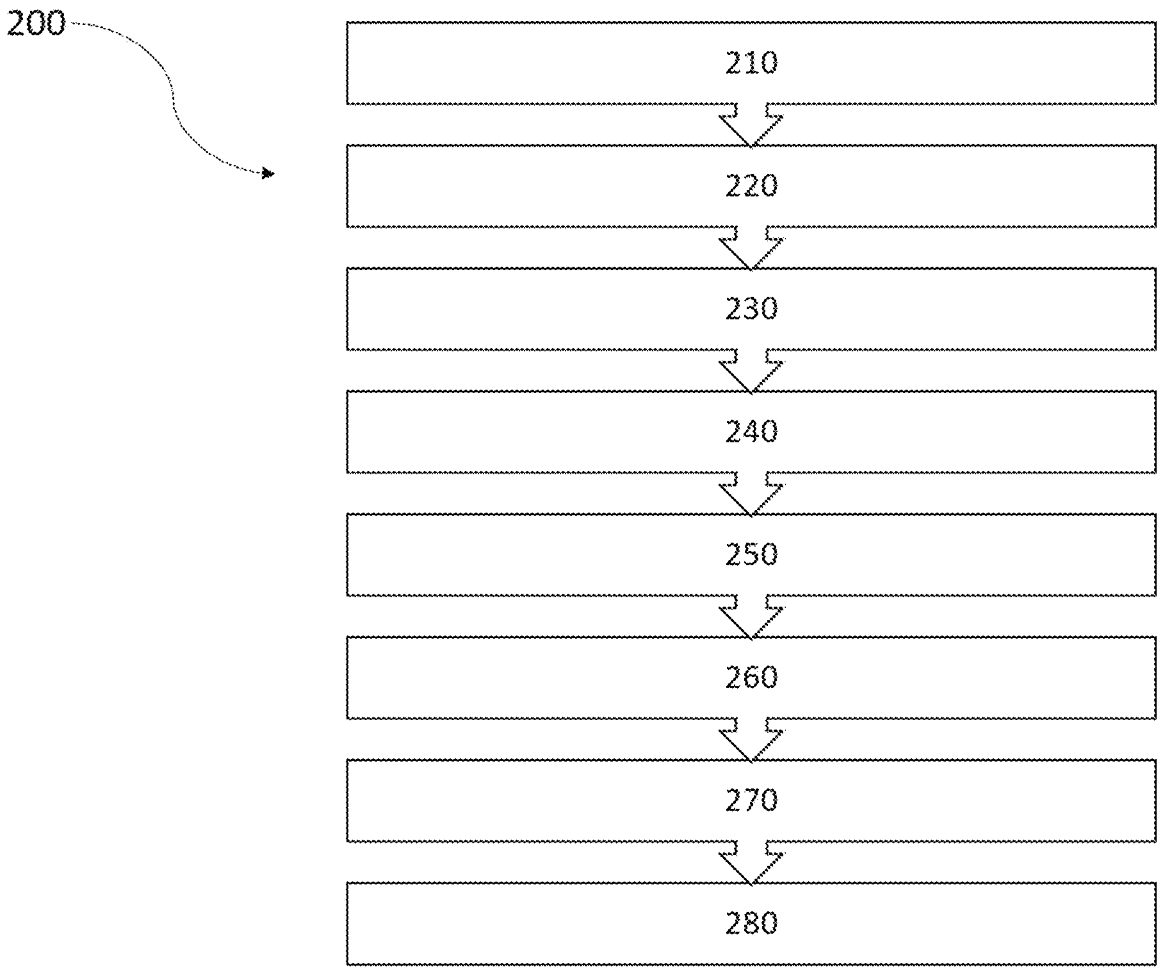
FIG. 2 is a flowchart of an authentication method according to an embodiment of the present invention.

According to an embodiment and as illustrated by FIGS. 1 and 2, the authentication method 200 comprises at least the following steps.

a. acquiring 210, preferably using said optical unit OPT1 41, at least a plurality of images I 44 of the visual item VI 50 to be authenticated, preferably of an area comprising the visual item VI 50 to be authenticated, advantageously each image $I_t$ of the plurality of images I 44 comprises at least partially one digital representation of said visual item VI 50, preferably the image $I_t$ is acquired at a time t; and b. for each image $I_t$ of the plurality of images I 44, generating 220, by said processing unit CPU1 42, a corrected image $Ic_t$; said corrected image $Ic_t$ is preferably spatially corrected; all these corrected images $Ic_t$ form a plurality of corrected images Ic, preferably a plurality of spatially corrected image Ic; and c. for each corrected image $Ic_t$ of the plurality of corrected images Ic:

i. extracting 230, by said processing unit CPU1 42, a plurality of features; and ii. generating 240, by said processing unit CPU1 42, a digital fingerprint $F_t$ 45 of the digital representation of the visual item VI 50 from the corrected image $Ic_t$ using at least a portion of said extracted plurality of features; and iii. calculating 250, by said processing unit CPU1 42, at least one distance metric $D(Ic_t)$ between said digital fingerprint $F_t$ 45 and said stored digital fingerprint $F_0$ 11; and iv. calculating 260, by said processing unit CPU1 42, a first likelihood function $L(Ic_t|H)$ of authenticity H of the visual item VI 50 from its digital representation from the corrected image $Ic_t$ based on said calculated distance metric $D(Ic_t)$ and a second likelihood function $L(Ic_t|G)$ of non-authenticity G of the visual item VI 50 from its digital representation from the corrected image $Ic_t$ based on said calculated distance metric $D(Ic_t)$; and v. computing 270, by said processing unit CPU1 42, a probability P(H) that the visual item VI 50 is authentic using the first likelihood function $L(Ic_t|H)$ and the second likelihood function $L(Ic_t|G)$, preferably the probability P(H) is updated each time a new digital fingerprint $F_t$ 45 is generated, i.e. each time the steps 230 to 260 are executed regarding a new corrected image $Ic_t$; and d. confirming 280 the authentication of the visual item VI 50, by said processing unit CPU1 42, if the probability P(H) is greater than a predetermined threshold.

According to an embodiment, each image $I_t$ of the plurality of images I 44 comprises an area comprising at least a portion of the visual item VI 50 to be authenticated, i.e. each image $I_t$ of the plurality of images I 44 comprises at least partially one digital representation of said visual item VI 50. According to one embodiment, each image $I_t$ are a frame extracted from a set of frames coming from a video, advantageously acquired by the optical unit OPT1 41, preferably in real time. Indeed, according to an embodiment, the optical unit OPT1 41 can be configured to acquire a video of an area comprising at least a portion of the visual item VI 50 to be authenticated, and each image $I_t$ comes from said video. According to an embodiment, these images $I_t$ are selected based on a random selection from said video and/or correspond to a continuous portion of frames of said video. According to another embodiment, based on the quality score discussed hereafter, some images $I_t$ can be removed from the plurality of images I 44 and/or other images $I_t$ can be extracted from the video and added to the plurality of images I 44.

According to an embodiment, the image $I_t$ of the plurality of image I 44 is acquired during the processing of the image $I_t$ by the processing unit CPU1 42, said processing comprising the steps of generating 220 a corrected image Ic, extracting 230 a plurality of features, generating 240 a digital fingerprint $F_{t-1}$ 45, calculating 250 the distance metric $D(IC_{t-1})$, calculating 260 the first likelihood function $L(Ic_{t-1}|H)$ of authenticity H of the visual item VI 50 and a second likelihood function $L(Ic_{t-1}|G)$ of non-authenticity G of the visual item VI 50 and computing 270 the probability P(H) that the visual item VI 50 is authentic.

Indeed, according to said embodiment, the step of generating 220 the corrected image $I_t$ is executed whereas the step of acquiring 210 the plurality of images I 44 is still executed According to an embodiment, at least some of the following steps of the authentication method 200 are executed in real time when the image $I_t$ is acquired:

a. generating 220 a corrected image $Ic_t$ from the image $I_{t-1}$, and b. extracting 230 a plurality of features from the corrected image $I_{t-1}$, and c. generating 240 a digital fingerprint $F_{t-1}$ 45, and d. calculating 250 the distance metric $D(IC_{t-1})$, and e. calculating 260 the first likelihood function $L(I_{t-1}|H)$ of authenticity H of the visual item VI 50 and a second likelihood function $L(Ic_{t-1}|G)$ of non-authenticity G of the visual item VI 50, and f. computing 270 the probability P(H) that the visual item VI 50 is authentic.

According to an embodiment, before acquiring the image $I_t$, the computing step 270 is executed based on the image $I_{t-1}$.

According to an embodiment, the processing steps regarding the image $I_t$ can be done before, and/or during and/or after the acquisition of image $I_{t+1}$.

According to an embodiment, the plurality of images I 44 can be acquired from at least a digital file, for example by downloading at least one digital file. According to said embodiment, said optical unit OPT1 41 can comprise a module configured to download at least one image of at least one visual item, preferably using a QR code as a link for downloading said at least one image of at least one visual item.

According to an embodiment, the optical unit OPT1 41 can be at least one camera of a smartphone.

According to an embodiment, the step of generating 220 a corrected image $Ic_t$ for each image $I_t$ of the plurality of image I 44 is configured to identify at least one spatial feature on each digital representation of the visual item from the image $I_t$, and then to use this spatial feature to spatially correct the image $I_t$ in order to create a plurality of spatially corrected images Ic. Several ways can be used to spatially correct the images $I_t$ and are well-known by the skilled person in the art. These corrections can be needed due to the orientation of the optical unit OPT1 41 regarding the visual item VI 50. These corrections can be linked with perspective misalignment for example.

According to an embodiment, the step of generating 220 a corrected image $Ic_t$ can comprise a step of detecting a contour, i.e. a border, and/or at least a portion of a contour and/or of a border, and/or at least a mark on the visual item VI 50 and/or and the medium 51 carrying it, allowing the processing unit CPU1 42 to determine the spatial orientation of the visual item VI 50 regarding the optical unit OPT1 41 and/or the spatial orientation of the optical unit OPT1 41 regarding the visual item VI 50. According to an embodiment, the processing unit CPU1 42 can use the optical unit OPT1 41 and at least one sensor to evaluate the orientation in space of the optical unit OPT1 41 with respect to the visual item VI 50, such as for example a gyroscope and/or an accelerometer.

According to an embodiment, the detection of a border, i.e. of a contour, in the digital representation of the visual item VI 50 can comprise the detection of at least three of the four corner points of a border, preferably the detection of the four corner points of a border or of a contour. This detection can be done using for example TensorFlow Lite's implementation of EfficientNet deep learning model which is common for the skilled person in the art. As this detection use deep learning, it can be trained using different set of images and/or borders and/or spatial orientations. According to an embodiment, the detection of a border, i.e. of a contour, in the digital representation of the visual item VI 50 can comprise the detection of at least a portion of corners of the corners of a polygon.

According to an embodiment, the step of generating 220 a corrected or spatially corrected image $Ic_t$ can comprise a step of estimating the projective transform between the optical unit OPT1 41 coordinate system and the world coordinate system, i.e. the coordinate system wherein the visual item VI 50 is located. Once this projective transform is estimated, a step of warping the image $I_t$ into the image $Ic_t$ is executed, preferably by the processing unit CPU1 42, to generate a spatially corrected image $Ic_t$.

According to an embodiment, the main goal of correcting the images $I_t$ is to calibrate the digital representation of the visual item VI 50 to be in the same perspective that the perspective of the authentic visual item during the step of generating 140 of the stored digital fingerprint $F_0$ as described hereafter. Preferably, the correction of these images $I_t$ allows to get corrected images $Ic_t$ that are spatially oriented in a virtual plane parallel to the plane of the lens of the optical unit OPT1 41.

According to an embodiment, the step of generating 220 a corrected image $Ic_t$: can comprise a correction of some of the image $I_t$ features such as luminosity, contrast, saturation, etc.

According to an embodiment, the step of extracting 230 a plurality of features from each corrected images $Ic_t$ can comprise the extraction of at least one feature vector from each corrected image $Ic_t$, preferably from each digital representation of the visual item VI 50 comprised by each spatially corrected image $Ic_t$. For example, this feature vector can be based on Discrete Cosine Transform (DCT) and can be calculated on local regions, for example rectangle, of each corrected image $Ic_t$. For example, each region is resized to a predefined size, then a DCT is applied on that region, preferably a bidimensional DCT or even a three-dimensional DCT if the digital representation of the visual object comprises three-dimensional data, then the frequency response from the top-left of the DCT transform is taken and is used to form said feature vector. This is the feature vector of one region also called the feature of this region. The same process is repeated for different regions, and the present invention allows to extract a final vector that is advantageously the concatenation of feature vectors of all regions. According to an embodiment, each value of the feature vector is quantized using the feature vector median/percentiles. In this way, said feature vector becomes a binary vector. For example, considering a feature vector [1,2,3,4, 5,6,7,8,9,10,11,12], if the median, which is equal to 6.5 in this example, is used to quantized said feature vector, i.e. to cut into two subranges said feature vectors, then said the feature vector becomes [0,0,0,0,0,0,1,1,1,1,1, 1], which is a binary vector. For example, if one considers the following percentiles: between 0% and 25%, between 25% and 50%, between 50% and 75% and between 75% and 100% to cut into 4 sub-ranges said feature vector, then the feature vector becomes [0,0,0,1,1,1,2,2,2,3,3,3], preferably then on can again binarize said feature vector into [00, 00, 00, 01, 01, 01, 10, 10, 10, 11, 11, 11].

According to an embodiment, these different regions can be all the regions of the corrected image $Ic_t$, i.e. all the image $Ic_t$ is considered in this step 230. According to another embodiment, only one region can be used if the corrected image $Ic_t$, is relatively small, for example not more than a few hundred pixels times a few hundred pixels, in this example this only one region relates the whole corrected image $Ic_t$.

According to another embodiment, the corrected image $Ic_t$ can be divided into a grid, and different regions of the corrected image $Ic_t$ are therefore defined. All these regions can be used to generate the final vector or only a predetermined number of regions can be randomly selected forming a subset used to generate said vector. When there is several regions to be considered, the feature vector of the corrected image $Ic_t$ from each region is concatenated to form only one final vector that represents all the considered feature vectors. According to an embodiment, and as described hereafter, a region of the corrected image $Ic_t$ can be ignored during this step 230, said region comprising the stored digital fingerprint $F_0$ 11 for example. Indeed, as discussed hereafter, when the stored digital fingerprint $F_0$ 11 is located on the visual item itself, the region comprising it is not considered by the step of extracting 230 said plurality of features.

According to an embodiment, the step of generating 240 a digital fingerprint $F_t$ 45 of the digital representation of the visual item VI 50 from a corrected image $Ic_t$ is configured to use at least a portion of the extracted features, i.e. of the final vector, to generate said digital fingerprint $F_t$ 45. Advantageously, the final vector of a corrected image $Ic_t$ is the digital fingerprint $F_t$ 45 of said corrected image $Ic_t$, i.e. of the digital representation of the visual item VI 50 from said corrected image $Ic_t$.

According to an embodiment, the step of generating 240 the digital fingerprint $F_t$ 45 can comprise a step of selecting a subset of features from said plurality of features, i.e. a subset of elements from said final vector. According to an embodiment, said step of selecting a subset of features can comprise a step of reducing the dimension of the final vector, i.e. of the digital fingerprint $F_t$ 45, to a predetermined number of bytes.

According to an embodiment, said step of selecting a subset of features from said plurality of features can be based on an artificial intelligence algorithm A0. Preferably, said artificial intelligence algorithm A0 is configured to select a subset of low-dimension from the high-dimensional final vector that best discriminates between authentic and non-authentic visual items.

According to an embodiment, said artificial intelligence algorithm A0 is configured to solve a one-zero trace ratio optimization problem, this method is well-known by the skilled person in the art.

According to another embodiment, said artificial intelligence algorithm A0 is configured to use a Random Forest algorithm to permutate the importance of the feature vectors.

In order to train said artificial intelligence algorithm A0, training data can be used. These training data can comprise two sets of verifications attempts: one set contains authentic verification attempts, where the visual item is authentic, the other set contains non-authentic verification attempts, where the visual item is not authentic.

According to an embodiment, the authentication method 200 can comprise, before the step of extracting 230 the plurality of features from a corrected image $Ic_t$, a step of calculating a quality score of each image $Ic_t$ by the processing unit CPU1 42. Preferably, only if said quality score is higher than a predetermined threshold, the step of extracting 230 from said image $Ic_t$ the plurality of features is executed. This allows to consider only images $Ic_t$ wherein the quality of the digital representation of the visual item VI 50 is sufficient to the extraction 230 of the features used for the generation of the digital fingerprint $F_t$ 45.

According to an embodiment, said quality score can be based on several parameters. For example, these parameters can comprise one of the following: luminosity of the corrected image $Ic_t$, contrast of the corrected image $Ic_t$, saturation of the corrected image $Ic_t$, scanning distance between the optical device OPT1 41 and the visual item VI 50 to be authenticated, scanning perspective between the optical device OPT1 41 and the visual item VI 50 to be authenticated, characteristics of the optical unit OPT1 41, the resolution of the corrected image $Ic_t$, etc.

Said quality score allows to eliminate the corrected images Ic having bad resolutions for example or having a bad quality that would negatively impact the calculation of the distance metrics $D(Ic_t)$. As the same time, this quality score allows to weight, as described hereafter, the corrected images $Ic_t$ based on their quality score to favorize the corrected images Ic with a better-quality score.

According to an embodiment, the stored digital fingerprint $F_0$ 11 can be in the form of a barcode, a QR code, a data matrix, a number, a sentence, a watermark, a metadata, a data stored in a memory, a data stored in a memory of a smartcard, etc. According to an embodiment, the stored digital fingerprint $F_0$ 11 can be stored in a server. For example, in this case, the value document comprising the visual item VI 50 can comprise any kind of mark or readable data allowing the authentication device AD 40 to download said stored digital fingerprint $F_0$ 11 from said server.

It has to be noticed, that the authentication method 200 can comprise a step of acquiring the stored digital fingerprint $F_0$ 11, preferably by the optical unit OPT1 41, then preferably a step of decoding said stored digital fingerprint $F_0$ 11 by the processing unit CPU1 42. These two steps can be executed directly one after the other or indirectly one after the other.

According to an embodiment, the step of acquiring the stored digital fingerprint $F_0$ 11 is executed as the same time that the step of acquiring 210 the plurality of images I 44 of the visual item VI 50.

According to an embodiment, the step of decoding the stored digital fingerprint $F_0$ 11 is executed before the step of generating 240 the digital fingerprint $F_t$ 45.

According to another embodiment, the authentication device AD 40 can comprise a communication unit COM1 configured to communicate with at list one server and to download at least a stored digital fingerprint $F_0$ 11 from said server.

According to an embodiment, the authentication device AD 40 can comprise a communication unit COM1 configured to communicate with at list a smartcard wherein the stored digital fingerprint $F_0$ 11 is stored. For example, said smartcard can carry said visual item VI 50.

According to an embodiment, the authentication device AD 40 can comprise a communication unit COM1 configured to communicate with at list a RFID tag (Radio-frequency identification tag) wherein the stored digital fingerprint $F_0$ 11 is stored. For example, said RFID tag can be carried with said visual item VI 50 on a same medium 51.

According to an embodiment, the stored digital fingerprint $F_0$ 11 comprises a vector $V_0$. Said vector $V_0$ comprises a predetermined number N of elements, such as a predetermined number of bytes for example. The digital fingerprint $F_t$ 45 comprises a vector $V_t$. Said vector $V_t$ comprises a number M of elements. Preferably, the number M is lower or equal to the number N. Advantageously, the number M is a function of the quality score of the corrected image $Ic_t$. This allows to generate a digital fingerprint $F_t$ 45 comprising a number of elements linked to the quality score of the corrected image $Ic_t$. In this way, if the quality score is low, then the length of the digital fingerprint $F_t$ 45, and therefore its complexity, is reduced, i.e. the digital fingerprint $F_t$ 45 is less sensible to the details of the corrected image Ic. In the case where the quality score is high, then all the length of the digital fingerprint $F_t$ 45 can be considered According to an embodiment, for the calculation of the distance metrics $D(Ic_t)$ described hereafter, the stored digital fingerprint $F_0$ 11 can be cut in order to consider the same amount of element, i.e. the same length, as the generated digital fingerprint $F_t$ 45.

For example, if the generated digital fingerprint $F_t$ 45 comprises only 32 bytes, for example because of the quality score of the corrected image $Ic_t$, then the processing unit CPU1 42 calculate the distance metrics $D(Ic_t)$ based on these 32 bytes and on the first 32 bytes of the stored digital fingerprint $F_0$ 11.

Figures 10, 11:
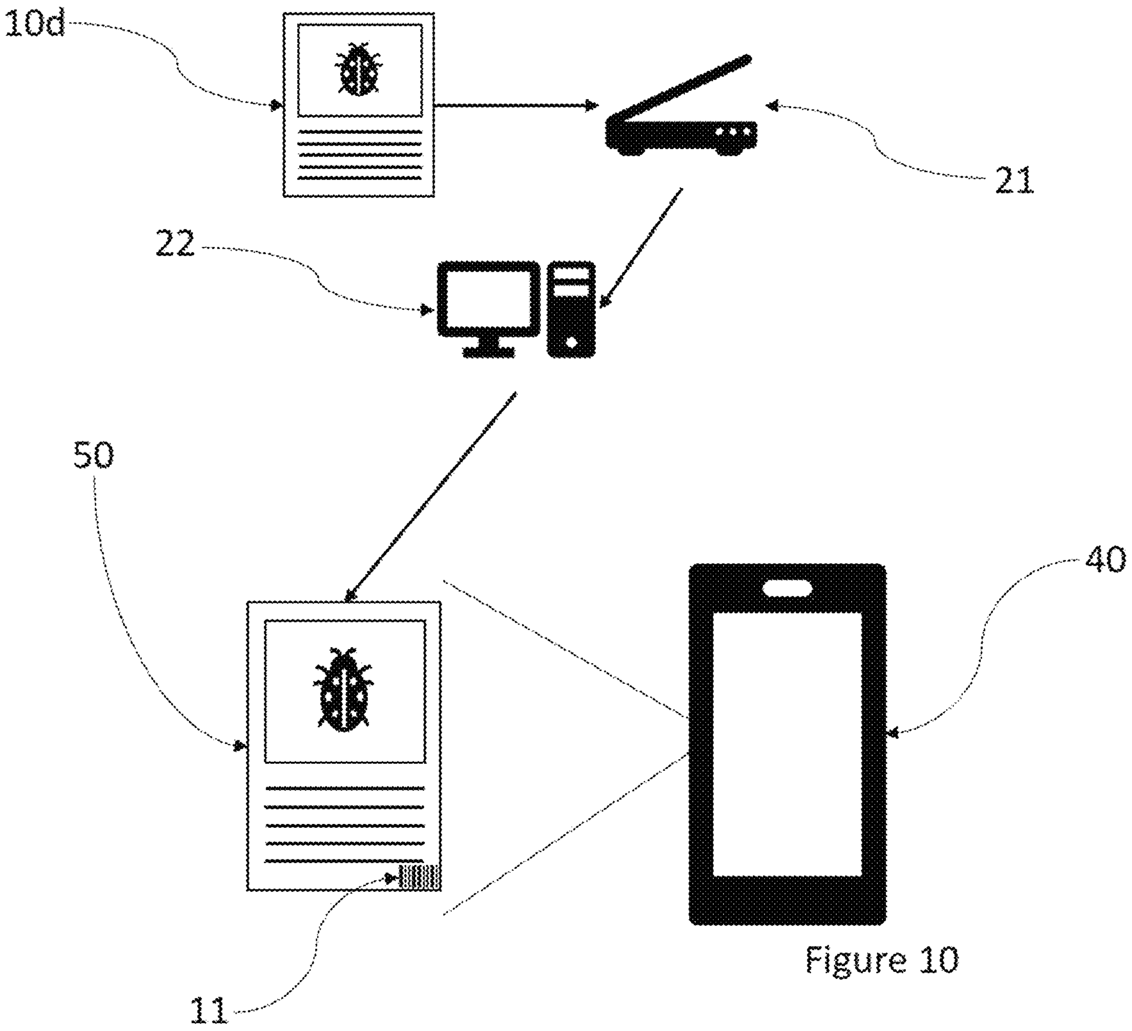
FIG. 10 is a schematic view of another example of implementation of the present invention.
FIG. 11 is a schematic view of a step of extracting features vector from a mathematical transformation of an image according to an embodiment of the present invention

The FIG. 11 illustrates an example of generation of a digital fingerprint. As previously indicated, the digital fingerprint $F_t$ 45 can be based on DCT of a digital representation of a visual item VI 50. These DCT transform a digital representation of the visual item VI 50 into a two-dimensional matrix, where the top-left part encodes low-frequency information, i.e. the low detailed features of the corrected image $Ic_t$, and the bottom-right part encodes high-frequency information, i.e the high detailed features of the corrected image $Ic_t$.

According to an embodiment, the digital fingerprint $F_t$ 45 is constructed from a top-left part of the DCT coefficient matrix as illustrated in FIG. 11. For example, if the processing unit considers l×l parts of this matrix, then the digital fingerprint $F_t$ 45 has l×l bits, or $$\frac{l \times l}{8}$$

bytes. As illustrated in FIG. 11, according to an embodiment, the extraction of the elements to generate the vector $V_t$, i.e. the digital fingerprint $F_t$ 45, from the matrix is done based on a nonlinear reading of the matrix. According to FIG. 11, block 1 is taken, then block 2, then block 3, and so on to generate the vector $V_t$ as $V_t$=[block 1, block 2, block 3, block 4, block 5, block 6, . . . ]. As discussed hereafter, picking the element from the matrix in this order allows to concentrate the low-frequency part of the matrix at the beginning of the vector $V_t$ Indeed, the vector $V_t$ is not constructed by reading line by line or column by column the matrix, but rather by picking a block on a zig-zag way from the top-left block of the matrix to the bottom-right block of the matrix Therefore, if the quality score of the corrected image Ict is below a threshold, the digital fingerprint $F_t$ 45 comprises a lower number of elements, these elements being related to the low frequency information of the corrected image $Ic_t$, therefore to the top-left part of the matrix, therefore the vector $V_t$ can be easily cut by considering only the first elements, i.e. the elements related to the low frequency information of the corrected image $Ic_t$.

Preferably, based on the quality of the corrected image $Ic_t$ which is given by its quality score, all the information comprised by this matrix is not necessary used. Indeed, for example, if the corrected image $Ic_t$ is of very good quality, the whole matrix can be used, for example a 24 by 24 matrix, resulting in a generated digital fingerprint $F_t$ 45 having a length of 72 bytes. However, if the corrected image $Ic_t$ is of lower quality, only a portion of the matrix is used, preferably the top-left portion, for example the top-left portion of 24 by 24 matrix, resulting in a generated digital fingerprint $F_t$ 45 having a length of 48, or 32 or even 16 bytes, which is determined preferably by the quality score.

According to an embodiment, the quality score can consider also if the corrected image $Ic_t$ comprises noise such as scratch/dust on the presentation medium. Advantageously, to calculate the distance metrics $D(Ic_t)$ between the stored digital fingerprint $F_0$ 11 having N elements, for example 72 bytes, and the generated digital fingerprint $F_t$ 45 of the corrected image $Ic_t$ having M elements, for example less than 72 bytes, only the corresponding first elements M of the vector $V_0$ are considered, and only the top-left part of the matrix Q is used, as described hereafter.

To facilitate this adaptive length, the cells in I times I blocks is ordered in a zig-zag way as illustrated in FIG. 11 to transform the 2D DCT matrix into 1D vector $V_t$, i.e. the digital fingerprint $F_t$ 45. Advantageously, this allows to know that the elements to the left of vector $V_t$ encodes the low frequency information, and elements to the right encodes high frequency information. Preferably, if the vector $V_t$ has to be cut to a specific length, preferably based on a quality score, the processing unit CPU1 42 just has to cut at the specific amount of byte from the left for example.

As described hereafter and due to the stored digital fingerprint $F_0$ 11 generation method 100, the stored digital fingerprint $F_0$ 11 is calculated by using a larger part of the matrix to take into consideration of higher frequencies, i.e. more details of the authentic visual item AVI 10. According to an embodiment, the method uses 24×24 block, resulting in a vector $V_0$, i.e. the stored digital fingerprint $F_0$ 11, of 576 bits, i.e. of 72 bytes, as usually the digital representation of the authentic visual item AVI 10 is a digital image with high quality, i.e. the image I used to generate the stored digital fingerprint $F_0$ 11 is a digital image with the highest quality score for example.

According to an embodiment, after the generation of the digital fingerprint $F_t$ 45 of a corrected image $Ic_t$, the authentication method comprises the step of calculating 250, by the processing unit CPU1 42, at least one distance metric D(Ict) between said digital fingerprint $F_t$ 45 and said stored digital fingerprint $F_0$ 11. Said distance metric D(Ict) can be calculated using different solutions. According to a preferred embodiment, said distance metric D(Ict) is a mahalanobis distance metric. A mahalanobis distance metric between two vectors x and y can be written as follow.

$$D_Q(x, y) = \sqrt{[x_1 - y_1, \ldots, x_D - y_D]\begin{bmatrix} q_{1,1} & q_{1,2} & \cdots & q_{1,D} \\ q_{2,1} & q_{2,2} & \cdots & q_{2,1} \\ \vdots & \vdots & \ddots & 0 \\ q_{D,1} & q_{D,2} & \cdots & q_{D,D} \end{bmatrix}\begin{bmatrix} x_1 - y_1 \\ \cdots \\ x_D - y_D \end{bmatrix}} == \sqrt{[x_1 - y_1, \ldots, x_D - y_D]Q\begin{bmatrix} x_1 - y_1 \\ \cdots \\ x_D - y_D \end{bmatrix}}$$

Advantageously, in the implementation of the invention, the vector x can be replaced by the stored digital fingerprint $F_0$ 11 and the vector y can be replaced by the generated digital fingerprint $F_t$ 45.

According to an embodiment, the distance metric $D(Ic_t)$ is preferably calculated using a matrix Q as a mathematical operator between the stored digital fingerprint $F_0$ 11 and the digital fingerprint $F_t$ 45. Preferably, the matrix Q is a positive semi-definite matrix.

According to an embodiment, if the matrix Q is an identity matrix, then the distance metric degenerates to an Euclidean distance, if the matrix Q is a diagonal matrix, then the distance degenerates to a weighted Euclidean distance, if the matrix Q is a general matrix, then the distance metric can capture very complex interactions between different feature dimensions and the distance metric is a mahalanobis distance metric Advantageously, the present invention comprises a step of training an artificial intelligence algorithm A3 configured to optimize said matrix Q using at least a set of data SD3 and a set of data SD4. The set of data SD3 preferably contains authentic verification attempts, where the visual item is authentic, and the set of data SD4 preferably contains non-authentic verification attempts, where the visual item is not authentic. This training step is configured to optimize the matrix Q in a way that:

a. the distance metric $D(Ic_t)$ between the generated digital fingerprint $F_t$ 45 and the stored digital fingerprint $F_0$ 11 is as small as possible using said set of data SD3, i.e. the images of the set of data SD3 corresponding to authentic visual items; and
b. the distance metric $D(Ic_t)$ between the generated digital fingerprint $F_t$ 45 and the stored digital fingerprint $F_0$ 11 is as large as possible using a set of data SD4, i.e. the images of the set of data SD4 corresponding to non-authentic visual items.

Indeed, the main goal of this artificial intelligence algorithm A3 is to obtain a matrix Q that:

a. maximizes the distance metric $D(Ic_t)$ using said training data SD3; and
b. minimizes the distance metric $D(Ic_t)$ using said training data SD4.

According to an embodiment, this training step can use a method called a trace-ratio optimization problem or an improvement of the trace ratio optimization with sparse representation constraints. Using one of these technics allows this training step to optimize said matrix Q.

According to an embodiment, the step of calculating 260 a first likelihood function $L(Ic_t|H)$ of authenticity H of the visual item VI 50 from its digital representation from the corrected image $Ic_t$ based on said calculated distance metric $D(Ic_t)$ comprises the following steps a. fitting a probability distribution or probability density function PD1 of a distance metric D(SD1) from at least one set of training data SD1, said set of training data SD1 corresponding to authentic visual items; and
b. for each image $Ic_t$, calculating the first likelihood function $L(Ic_t|H)$ as the probability or probability density given by PD1 at the distance metric $D(Ic_t)$, According to another embodiment, the first likelihood function $L(Ic_t|H)$ can be calculated as being the probability density given by PD1 at the distance metric $D(Ic_t)$.

According to an embodiment, the first likelihood function $L(Ic_t|H)$ can be partially generated by an artificial intelligence algorithm A1 using at least the first set of training data SD1. According to this embodiment, the first likelihood function $L(Ic_t|H)$ can comprise at least a sub-function SF1. Said sub-function SF1 is preferably defined by a density of probabilities that the visual item VI 50 is authentic. Advantageously, said sub-function SF1 can be generated by the artificial intelligence algorithm A1 using said set of data SD1. According to an embodiment, said first sub-function SF1 corresponds to a mathematical model of authentic visual items, i.e. a mathematical model of the probability distribution or probability density function regarding the authentication of authentic visual items.

According to an embodiment, when the visual item VI 50 is carried by a medium 12, the present invention can consider the nature of medium 12 in order to optimize its execution, i.e. in order to optimize the computation of the probability P(H). For example, the visual item VI 50 can be a picture printed on a paper or on a plastic sheet or can be displayed by a screen for example. Based on the nature of the medium 12, the generated digital fingerprint $F_t$ 45 can be different. The present invention is preferably configured to consider the nature of the medium 12 in its calculations According to an embodiment, the first likelihood function $L(Ic_t|H)$ can be partially generated using an artificial intelligence algorithm A2 configured to generate at least one linear combination of mathematical models of media for each corrected image $Ic_t$ based on at least a plurality of mathematical models of media.

According to this embodiment, the artificial intelligence algorithm A2 is configured to classify the medium 12 carrying the visual item VI 50 according to a linear combination of mathematical models of media. Said artificial intelligence algorithm A2 can comprise the following steps:

a. extracting local binary patterns feature vectors at pixels among a plurality of pixels of each corrected image $Ic_t$, and b. calculating the histogram of the local binary patterns feature vectors throughout at least a portion of each corrected image $Ic_t$; and c. training a classifier which outputs the medium from the local binary patterns feature vectors based on a plurality of mathematical models of media, preferably the artificial intelligence algorithm has been trained to identify each mathematical model of said plurality of mathematical models of media; and d. using said classifier, generating at least one probability for each mathematical model of media of the plurality of mathematical models for each corrected image Ic that the visual item VI 50 is carried by a certain kind of media; and e. generating at least one linear combination of mathematical models of said media for the corrected image $Ic_t$.

According to an embodiment, the first likelihood function $L(Ic_t|H)$ can be partially generated using an artificial intelligence algorithm A5. Said artificial intelligence algorithm A5 can be configured to classify the quality of each corrected image $Ic_t$ of the plurality of corrected images Ic. According to an embodiment, said artificial intelligence algorithm A5 can use well known solutions such as a TensorFlow lite model, through a convolutional neural network CNN.

According to an embodiment, the second likelihood function $L(Ic_t|G)$ can be partially generated by an artificial intelligence algorithm A1' using at least the set of training data SD2. According to this embodiment, the second likelihood function $L(Ic_t|G)$ can comprise at least a sub-function SF2. Said sub-function SF2 is preferably defined by a density of probabilities that the visual item VI 50 is not authentic. Advantageously, said sub-function SF2 can be generated by the artificial intelligence algorithm A1' using the set of data SD2. According to an embodiment, said second sub-function SF2 corresponds to a mathematical model of non-authentic visual items, i.e. a mathematical model of the probability distribution or probability density function regarding the authentication of non-authentic visual items According to an embodiment, the second likelihood function $L(Ic_t|G)$ can be partially generated using an artificial intelligence algorithm A2' configured to generate at least one linear combination of mathematical models of media for each corrected image $Ic_t$ based on at least a plurality of mathematical models of media. According to this embodiment, the artificial intelligence algorithm A2' is configured to classify the medium carrying the visual item according to a linear combination of mathematical models of media. Said artificial intelligence algorithm A2 the artificial intelligence algorithms A2' can comprise the same steps that the artificial intelligence algorithm A2.

According to an embodiment, the second likelihood function $L(Ic_t\ |G)$ can be partially generated using an artificial intelligence algorithm A5'. Said artificial intelligence algorithm A5' can be configured to classify the quality of each corrected image $Ic_t$ of the plurality of corrected images Ic according to the previous described artificial intelligence algorithm A5.

Figure 12:
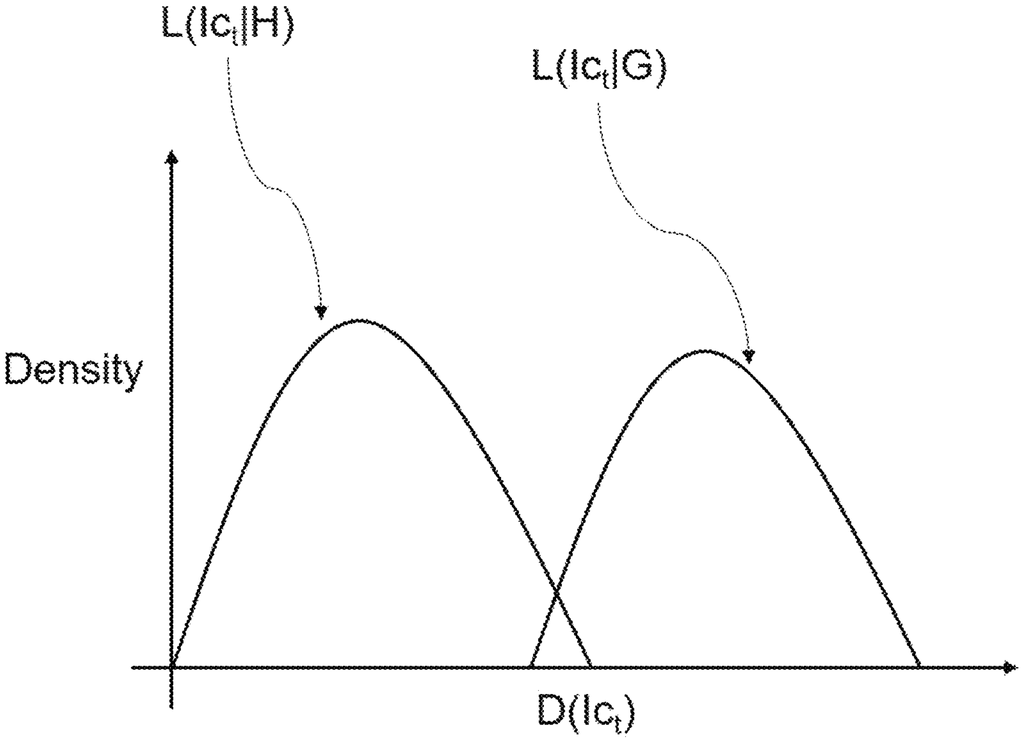
FIG. 12 is a schematic view of a first likelihood function $L(I_t|H)$ of authenticity H of a visual item based on a distance metric $D(Ic_t)$ and of a second likelihood function $L(Ic_t|G)$ of non-authenticity G of the visual item based on a distance metric $D(Ic_t)$ according to an embodiment of the present invention.

The FIG. 12 illustrates, according to an embodiment, the first likelihood function $L(Ic_t(H)$ and the second likelihood function $L(Ic_t|G)$. On this figure, it is represented on the abscissa the distance metrics $D(Ic_t)$ and on the ordinate the density of probability. As it is illustrated, the first likelihood function $L(Ic_t|H)$ covers an area corresponding to small distance metrics $D(Ic_t)$ whereas the second likelihood function $L(Ic_t|G)$ covers an area corresponding to large distance metrics $D(Ic_t)$. These two likelihood functions have been designed to correspond to the case of an authentic visual item for the first likelihood function $L(Ic_t|H)$ and of non-authentic visual item for the second likelihood function $L(Ic_t|G)$. Indeed, for an authentic visual item AVI 10, the distance metric $D(Ic_t)$ has to be small and therefore the probability distribution (probability density function) represented by the first likelihood function $L(Ic_t|H)$ has to cover smaller distance metrics $D(Ic_t)$ than the second likelihood function $L(Ic_t|G)$. On the opposite, for a non-authentic visual item, the distance metric $D(Ic_t)$ has to be large and therefore the probability distribution (probability density function) represented by the second likelihood function $L(Ic_t|G)$ has to cover higher distance metrics $D(Ic_t)$ than the first likelihood function $L(Ic_t|H)$.

Regarding these likelihood functions, according to an embodiment and as previously described, each corrected image $Ic_t$ will be analyze by the processing unit CPU1 41. The event H corresponds to the detection of an authentic visual item, and the event G correspond to the detection of a non-authentic visual item. Therefore, the probability P(H) is the probability that the visual item VI 50 is authentic, and the probability $P(G)=1-P(H)$ is the probability that the visual item VI 50 is not authentic. The probability distribution p(P(H)) is the probability distribution of the probability that the visual item VI 50 is authentic, and the probability distribution p(P(G)) is the probability distribution of the probability that the visual item VI 50 is not authentic. Based on that, the first likelihood function $L(Ic_t|H)$ corresponds to how probable to observe the corrected image $Ic_t$: if the visual item VI 50 is authentic, and the second likelihood function $L(Ic_t|G)$ corresponds to how probable to observe the corrected image $Ic_t$ if the visual item VI 50 is not authentic.

According to an embodiment, the first likelihood function and/or the second likelihood function can be at least partially generated based on features of the optical unit OPT1 41. Indeed, for example, based on the nature of the optical unit OPT1 41, for example based on its model, the likelihood functions can be trained through an artificial intelligence algorithm. According to this embodiment, for each model of camera, a specific first likelihood function can be considered and/or a specific second likelihood function can be considered.

According to an embodiment, the step of computing 270 the probability P(H) that the visual item VI 50 is authentic using the first likelihood function $L(Ic_t|H)$ and the second likelihood function $L(Ic_t|G)$ can comprise the following steps:

a. setting a prior probability $P_0(H)$ based on a predetermined set of rules, and b. for each spatially corrected image $Ic_t$, calculating a posterior probability $P_t(H)$ as $$P_t(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

and, c. calculating P(H) by computing a weighted moving average as follow.

$$P(H) = \frac{\sum_{i=0}^{w} \gamma_i P_{t-i}(H)}{\sum_{i=0}^{w} \gamma_i}$$

wherein w is the number of corrected images $Ic_t$ of the plurality of corrected image Ic and $\{\gamma_i\}$ (i=0, . . . w) are predetermined weights According to an embodiment, each predetermined weight applied to each of the corrected image $Ic_t$ is a function of the quality score of said corrected image $Ic_t$. Advantageously, each predetermined weight $\{\gamma_i\}$ (i=0 . . . w) applied to each of the corrected image $Ic_t$ is a function of the quality score of the corrected image $Ic_t$, preferably corresponding to the predetermined weight $\{\gamma_i\}$ (i=0, . . . w). Preferably, higher the quality score is, higher the weight is, and lower the quality score is, lower the weight is. This allows to give more credit to the corrected images Ic having a better-quality score than the ones having a bad quality score According to an embodiment, said prior probability $P_0(H)$ is set based on a predetermined set of rules. This predetermined set of rules can be established based on an artificial intelligence algorithm A4 for example, preferably using at least a decision tree. Said artificial intelligence algorithm A4 can be advantageously configured to generate a prior probability $P_0(H)$ based on at least one of these parameters: a reputation score based on the nature of the visual item, and/or the location of the visual item and/or on metadata related to the visual item and/or the issuer of the visual item and/or the issuer of a medium carrying the visual item, a uniform law of distribution, etc.

For example, and as described hereafter regarding the ID card implementation, the prior probability can be set according to the issuer of the card, preferably using historical data, for example for each issuer and/or country, the prior probability can be set to the percentage of authentic ID cards issued by this issuer and/or country over a predetermined number of time, such as a predetermined number of past years.

According to an embodiment, said artificial intelligence algorithm A4 uses a decision tree process and/or forests process consisting of decision trees process to generate said prior probability $P_0(H)$. For example, using said historical data, a decision tree model can be trained to generate the prior probability of a given issuer and/or a given country, which was not in the historical data According to an embodiment, the probability P(H) can be computed from a probability distribution p(P(H)) as described hereafter. In this case, the probability P(H) is related to at least one descriptive statistic of said probability distribution p(P(H)). Preferably the descriptive statistics of said probability distribution p(P(H)) can comprise, the mean, median, mode, range, IQR (Interquartile range), variance, standard deviation, a surface, a moment, etc.

According to another embodiment, the step of computing 270 a probability P(H) that the visual item VI 50 is authentic using the first likelihood function $L(Ic_t|H)$ and the second likelihood function $L(Ic_t|G)$ can comprise the following steps:

a. setting, by the processing unit CPU1 42, a prior probability distribution $p_0(P(H))$ based on a predetermined set of rules, and
b. sampling, by the processing unit CPU1 42, K independent prior probability values $\{P_{0,1}, \ldots P_{(0,K)}\}$ from the prior probability distribution $p_0(P(H))$; and
c. using each of these K prior probabilities $\{P_{(0,K)}\}_{(k=1 \ldots K)}$ calculating, by the processing unit CPU1 (42), K posterior probabilities $\{P_{(t,K)}\}_{(k=1 \ldots K)}$.

$$P_{t,k}(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

d. using the K posterior probabilities $\{P_{(t,K)}\}_{(k=1 \ldots K)}$, fitting, by the processing unit CPU1 42, a posterior probability distribution $p_t(P(H))$, and
e. calculating, by the processing unit CPU1 (42), p(P(H)) by computing a weighted moving average as follow:

$$p(P(H)) = \frac{\sum_{i=0}^{w} \alpha_i p_{t-i}(P(H))}{\sum_{i=0}^{w} \alpha_i}$$

wherein w is the number of spatially corrected image $Ic_t$ of the plurality of spatially corrected image Ic and $\{\alpha_i\}$ (i=0, . . . w) are predetermined weights.

As previously described, according to an embodiment, each predetermined weight applied to each of the corrected image $Ic_t$ is a function of the quality score of said corrected image $Ic_t$. Advantageously, each predetermined weight $\{\alpha_i\}$ (i=0, . . . w) applied to each of the corrected image $Ic_t$ is a function of the quality score of the corrected image $Ic_t$, preferably corresponding to the predetermined weight $\{\alpha_i\}$ (i=0, . . . w). Preferably, higher the quality score is, higher the predetermined weight is, and lower the quality score is, lower the predetermined weight is. This allows to give more credit to the corrected images Ic having a better-quality score than the ones having a bad quality score.

According to an embodiment, the predetermined set of rules used to set the prior probability distribution $p_0(P(H))$ can be based on the artificial intelligence algorithm A4 as previously discussed.

According to an embodiment, the authentication of the visual item VI 50 is confirmed if P(H) is greater than a predetermined threshold. For example, if the probability of authenticity P(H) is greater than 75%, preferably than 85% and advantageously than 95% then the visual item VI 50 is considered as being authentic.

Figure 13:
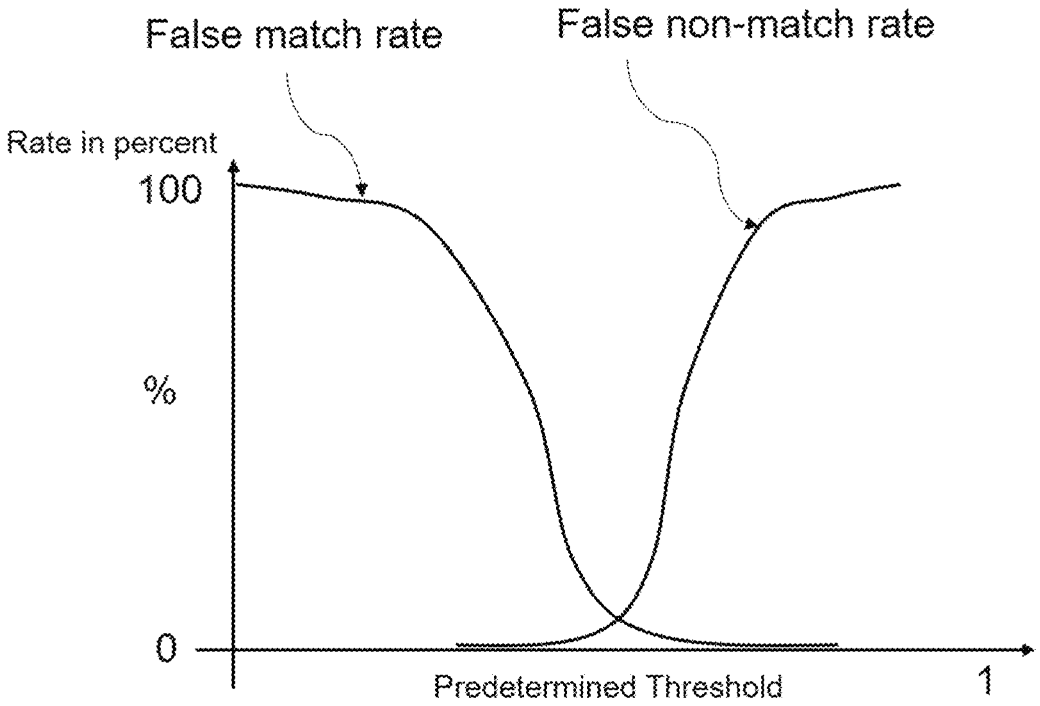
FIG. 13 is a schematic representation of the relation between the predetermined threshold, the estimated rate of false authentic detection event and the rate of false non-authentic detection event.

According to an embodiment, said predetermined threshold can be defined according to the use case of the present invention. Preferably, said predetermined threshold determines the trade-off between potential false matches and false non-matches, i.e. between false confirmation of authenticity and false confirmation of non-authenticity. For example, in use cases where false match is a more serious problem than false non-match, e.g. in a high security facility, a stricter threshold, i.e. a higher value of threshold, can be used. For another example, in use cases where non-false match is a more serious problem than false match, e.g. in a low security facility, a less strict threshold, i.e. a lower value of threshold, can be used. According to an embodiment, said predetermined threshold can be determined using a mathematical relation between the rate of false match, the rate of false non-match and the value of the predetermined threshold. For example, FIG. 13 illustrates such a mathematical relation. FIG. 13 illustrates a graph showing the expected false match rate and the expected false non-match rate in function of the threshold. Said mathematical relation is advantageously calculated using the previous described datasets SD1 and SD2, preferably using an artificial intelligence algorithm A6 using said datasets SD1 and SD2. According to an embodiment, the predetermined threshold can be found by looking up the acceptable false match rate and the acceptable false non-match rate.

According to an embodiment, said predetermined threshold can be based on the predetermined set of rules According to an embodiment, the probability P(H) is equal to at least one descriptive statistic of said probability distribution p(P(H). P(H) is advantageously the mathematical expectation of p(P(H)), such as:

$$P(H) = \int_0^1 p(y) y \, dy$$

According to an embodiment, the present invention relates to a computer program comprising instructions which, when the program is executed by the processing unit CPU1 42, cause the processing unit CPU1 42 to out the authentication method 200, i.e the steps of the authentication method 200.

Preferably, the processing unit CPU1 42 is configured to control the optical unit OPT1 41

According to an embodiment, the present invention relates to a computer-readable storage medium comprising instructions which, when the program is executed by the processing unit CPU1 42, cause the processing unit CPU1 42 to carry out the authentication method 200, i.e. the steps of the authentication method 200.

According to an embodiment, the authentication process can be implemented by a smartphone through an application for example that can be downloaded from an application store for example.

The present invention allows to determine if a visual item, preferably of any kind, is authentic or not based on a stored digital fingerprint, preferably a certified stored digital fingerprint, generated by an issuer, preferably a certified issuer.

The use of a plurality of images allows a user to determine if a visual item is authentic or not without the need of a dedicated reader, but simply using an application on his smartphone.

The present invention uses smartly several technics combined in an advantageously way allowing to evaluate with a high level of accuracy if a visual item is authentic or not.

Using artificial intelligence allows to overcome several technical issues such as the optical conditions of the acquisition of the plurality of images, the nature of the medium carrying the visual item, the nature of the visual item itself for example.

The Authentication Device

According to an embodiment, the present invention relates to an authentication device AD 40 configured to execute the authentication method 200 described here before.

Figure 3:
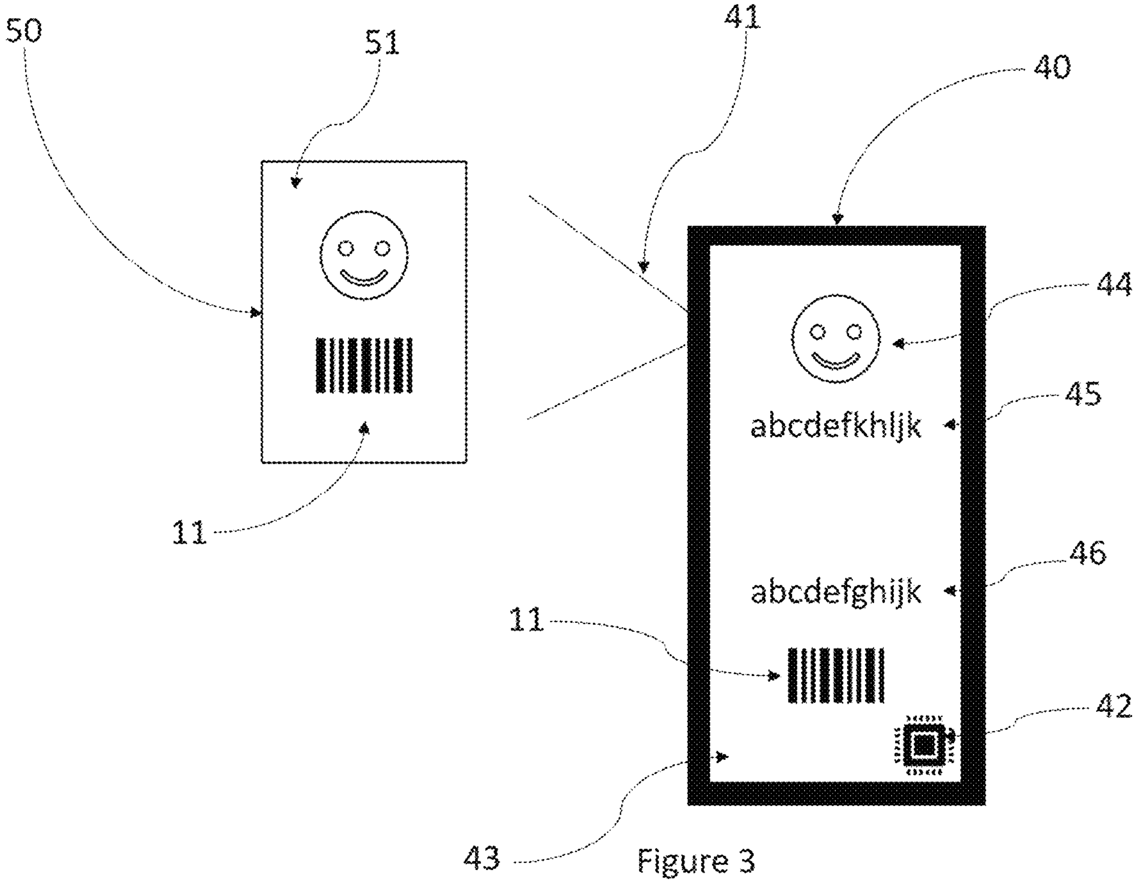
FIG. 3 is a schematic view of an authentication device according to an embodiment of the present invention.

According to a preferred embodiment, and as described in FIGS. 1 to 3, said authentication device AD 40 is configured to authenticate a visual item VI 50 using a stored digital fingerprint $F_0$ 11 associated to said visual item VI 50. Preferably, said authentication device AD 40 comprises:

a. an optical unit OPT1 41 configured to acquire 210 at least a plurality of images I 44 of an area comprising the visual item VI 50 to be authenticated, preferably each image $I_t$ of the plurality of images I 44 comprising at least partially one digital representation of said visual item VI 50; and b. a processing unit CPU1 42 configured to:

i. for each image $I_t$, generate 220 a corrected image $Ic_t$ by correcting the image $I_t$ preferably based on at least one spatial feature, creating the plurality of corrected images Ic; and ii. for each corrected image $Ic_t$:

extract 230 a plurality of features; and generate 240 a digital fingerprint $F_t$ 45 of the digital representation of the visual item VI 50 using at least a portion of said extracted plurality of features; and calculate 250 at least one distance metric $D(Ic_t)$ between said digital fingerprint $F_t$ 45 and said stored digital fingerprint $F_0$ 11; and calculate 260 the first likelihood function $L(Ic_t|H)$ and the second likelihood function $L(Ic_t|G)$ as previously described; and compute 270 the probability P(H) that the visual item VI (50) is authentic using the first likelihood function $L(Ic_t|H)$ and the second likelihood function $L(Ic_t|G)$; and iii. confirm 280 that the visual item VI 50 is authentic if P(H) is greater than a predetermined threshold.

c. advantageously, a communication unit COM1 configured to download the stored digital fingerprint $F_0$ 11 if needed and/or to send a message that the visual item VI 50 is authentic or not; and d. advantageously, a display unit configured to display at least the confirmation that the visual item VI 50 is authentic and/or to display the corrected image $Ic_t$ during the execution of the authentication method 200; and e. preferably, a power unit configured to power the authentication device AD 40.

According to an embodiment, the authentication device AD 40 is a smartphone and/or a laptop and/or a tablet.

As described by the FIGS. 1 to 3, and according to an embodiment, the user of the authentication device AD 40, for example a smartphone executing an application designed to execute the authentication method 200, takes a plurality of pictures, preferably a video, advantageously in real time, of a visual item VI 50 to be authenticated, for example an ID card. In this example, the camera of the smartphone, i.e. the optical unit OPT1 41, acquire a plurality of images of the ID card including the picture of the owner of said ID card as well as the stored digital fingerprint $F_0$ 11 encoded in the form of a barcode for example. Then, the processing unit CPU1 41 of the smartphone, i.e. of the authentication device AD 40, executes the steps of the authentication method 200 in order to generate for each corrected image $Ic_t$ a digital fingerprint $F_t$ 45, and to compare it with the stored digital fingerprint $F_0$ 11. According to an embodiment, the smartphone of the user can display what the optical device OPT1 41, i.e. the camera of the smartphone, is seeing, preferably in real time, allowing the user to move the smartphone regarding the visual item in order to optimize the acquisition of the plurality of images, i.e. in order to increase the quality score of the corrected images Ic as well as to optimize the relative position of the smartphone regarding the visual item VI 50, i.e. the ID card. Then, preferably, the processing unit CPU1 42 uses the display unit of the smartphone to notify the user if the picture located on the ID card corresponds to the picture used by the official issuer of said ID card to generate the stored digital signature $F_0$ 11.

According to an embodiment, the display unit can display the corrected image $Ic_t$ and/or its digital fingerprint $F_t$ 45 and/or the image of the stored digital fingerprint $F_0$ 11, for example the barcode encoding said stored digital fingerprint $F_0$ 11, and/or the decoding stored digital fingerprint $F_0$ 11 and/or the probability P(H).

According to an embodiment, the display unit of the authentication device AD 40 can display information, preferably in real-time, about the image quality, and/or messages for the user to move the authentication device AD 40 relatively to the visual item VI 50 in order to increase the quality score of the corrected images Ic. For example, these messages can comprise at least one among a word, a sentence, a drawing, a figure, a symbol, etc.

According to an embodiment, said processing unit CPU1 42 comprises at least one processor configured to execute at least one series of instructions, preferably stored by a memory. Said memory is preferably a non-transitory memory. Said memory advantageously stores a computer program as previously described.

Digital Fingerprint Generation Method

According to an embodiment, the present invention relates to a digital fingerprint generation method 100 configured to generate a digital signature $F_0$ 11 from an authentic visual item AVI 10, preferably using a digital fingerprint generation device GD 20 disclosed hereafter, said digital fingerprint generation device GD 21 comprising at least an optical unit OPT2 21, a processing unit CPU2 22 and preferably a storage unit SU2. Advantageously, said digital fingerprint $F_0$ 11 is configured to be stored, this storage can use different forms as previously described.

According to an embodiment, the digital fingerprint generation method 100 uses several similar features than the authentication method 200, advantageously regarding the generation of the digital fingerprint $F_t$ 45. As it will be explained, according to an embodiment, due to the stored digital fingerprint $F_0$ 11 is generated from a visual item 10 considered as authentic by the issuer, only one image I is sufficient to generate the stored digital fingerprint $F_0$ 11, whereas in the case of the digital fingerprint $F_t$ 45, the visual item VI 50 may be not authentic, therefore several images I have to be taken and considered to evaluate a probability P(H) that the visual item VI 50 is authentic.

Figure 5:
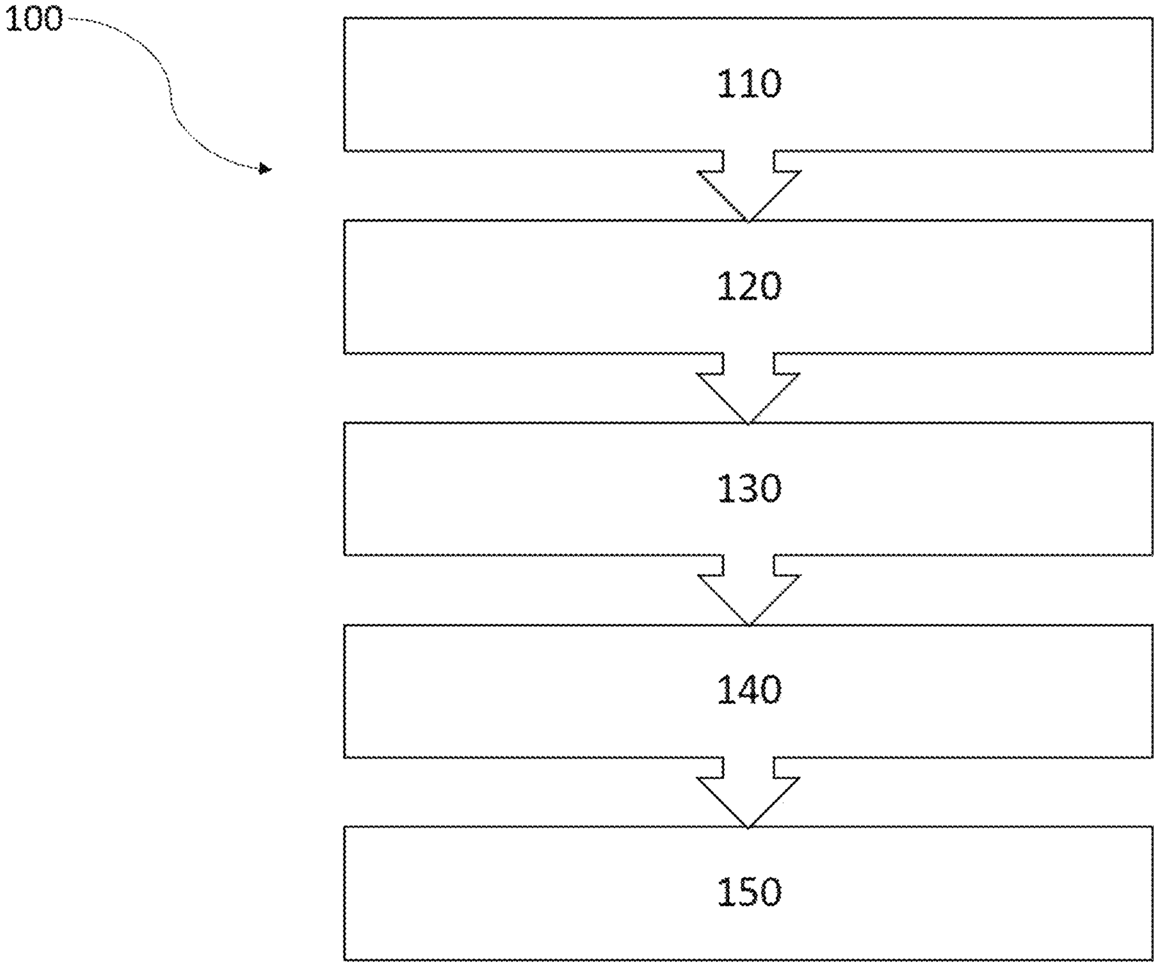
FIG. 5 is a flowchart of a digital fingerprint generation method according to an embodiment of the present invention.
Figure 6:
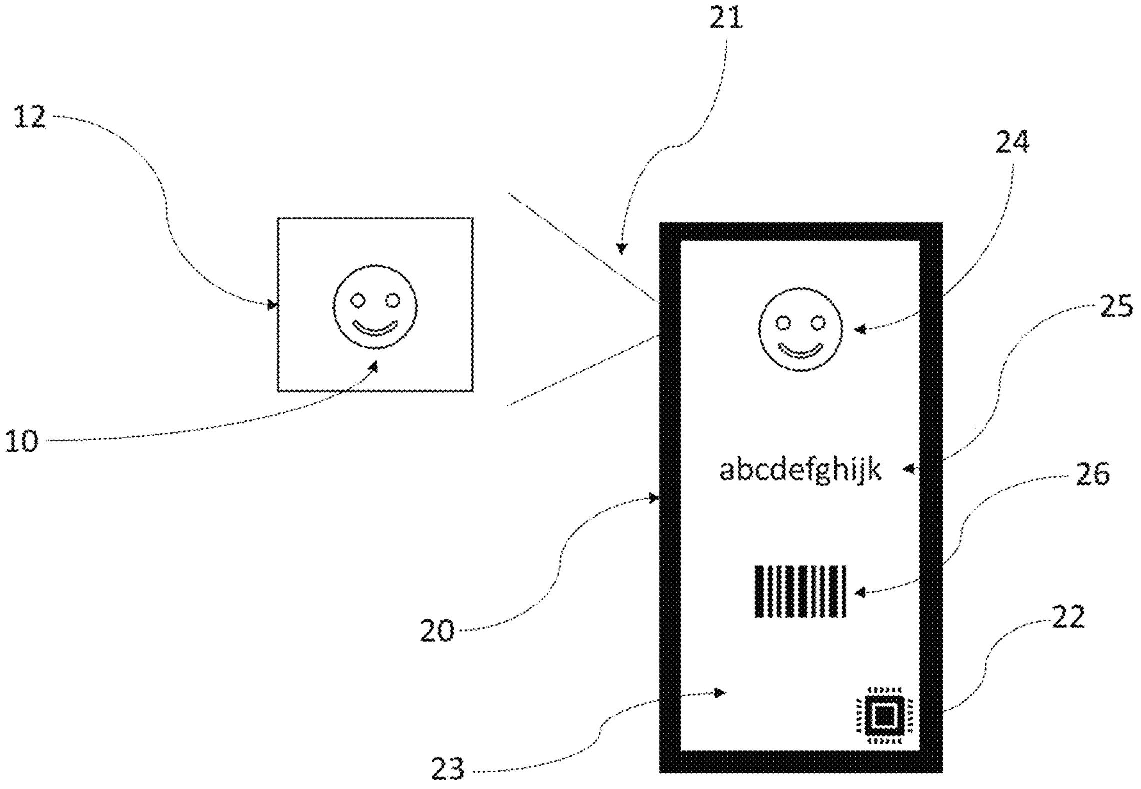
FIG. 6 is a schematic view of an example of a digital fingerprint generation device according to an embodiment of the present invention.

According to an embodiment, and as described in FIGS. 4 to 6, said digital signature generator method 100 comprises the following steps:

a. acquiring 110, preferably by the optical unit OPT2 21, at least one image I of the authentic visual item AVI 10. preferably said image I is a high-resolution image, i.e. its resolution is preferably higher than 300 dpi, advantageously higher than 720 dpi; according to an embodiment, said acquisition step can comprise a step of downloading said image I in a digital file form; advantageously, the image I can be download from a server and/or received by e-mail, and
b. preferably, generating 120, by the processing unit CPU2 22, a corrected image Ic, preferably a spatially corrected image Ic, by correcting the image I based on at least one spatial feature, preferably according to the process previously described; and
c. extracting 130, by the processing unit CPU2 22, a plurality of features from said image I, and/or from said corrected image Ic, preferably using the previously described methods; and
d. generating 140, by the processing unit CPU2 22, the digital fingerprint $F_0$ 11 of the digital representation of the authentic visual item AVI 10 from the image I and/or from the corrected image Ic, using at least a portion of said extracted plurality of features; and
e. preferably, storing 150, by the storage unit SU2, the digital fingerprint $F_0$ 11 in at least one of the following forms: a QR code, a data matrix, a barcode, a serial number, a watermark, a digital watermark, a metadata, data stored in a memory, etc.; according to an embodiment, said storage unit can be a computer, a server, a printer, a display, etc. Preferably, said storage unit SU2 is configured to store the digital fingerprint $F_0$ 11 in a place where the authentication device AD 40 is able to access it, preferably to acquire it and/or to download it. Advantageously, the storage unit SU2 is a printer and the digital fingerprint $F_0$ 11 is printed in the form of a QR code on the same medium than the authentic visual item is located. For example, regarding the use case of the ID card, the picture of the owner can be the authentic visual item and the stored digital fingerprint $F_0$ 11 can be printed near the authentic visual item; It has to be noted than the visual item, i.e. the picture of the owner of the ID card for example, is considered as being authentic by the issuer when the value document or the medium comprising the visual item and its stored digital fingerprint $F_0$ 11 is issued.

As previously described, the optical unit OPT2 21 is configured to acquire 110 at least one image I of the authentic visual item AVI 10. According to an embodiment, the optical conditions of this acquisition permit to acquire only one image I of the authentic visual item AVI 10, preferably a high-resolution image I. Advantageously, said optical unit OPT2 21 is a scanner.

According to an embodiment, the at least one image I of the authentic visual item AVI 10 can be acquired from at least a digital file, for example by downloading at least one digital file. According to said embodiment, said optical unit OPT2 21 can comprise a module configured to download at least one image I of at least said authentic visual item AVI 10. According to said embodiment, said optical unit OPT2 21 can comprise a module configured to download at least one image of at least one authentic visual item AVI 10, preferably using a QR code as a link for downloading said at least one image of said at least one authentic visual item AVI 10.

As previously described, the processing unit CPU2 22 is configured to:

a. preferably generate 120 a corrected image Ic, preferably if needed, by correcting the image I, advantageously based on at least one spatial feature; according to an embodiment, the acquisition step 110 of the image I can require a correction of said image due to misalignment for example and/or due to luminosity, contrast, saturation conditions: and
b. extract 130 a plurality of features from said image I and/or said corrected image Ic, preferably said spatially corrected image $Ic_t$; said extraction step 130 can use the same steps than the extraction step 230 previously described; and c. generate 140 the digital fingerprint $F_0$ 11 of the digital representation of the authentic visual item AVI 10 from the corrected image Ic using at least a portion of said extracted plurality of features; preferably, said step of generating the digital fingerprint $F_0$ 11 comprises the similar steps than the step of generating the digital fingerprint $F_t$ 45 previously described.

According to an embodiment, the present invention relates to a computer program comprising instructions which, when the program is executed by the processing unit CPU2 22, cause the processing unit CPU2 22 to carry out the digital fingerprint generation method 100, i.e. the steps of the digital fingerprint generation method 100.

Preferably, the processing unit CPU2 22 is configured to control the optical unit OPT2 21.

According to an embodiment, the present invention relates to a computer-readable storage medium comprising instructions which, when the program is executed by the processing unit CPU2 22, cause the processing unit CPU2 22 to carry out the digital fingerprint generation method 100, i.e. the steps of the digital fingerprint generation method 100.

The present invention allows to easily generate a digital fingerprint of a visual item, and then this digital fingerprint can be used to compare it with another digital fingerprint generated from a visual item. If these two digital fingerprints are closed enough from each other, then these visual items are in fact the same visual item, i.e. the visual item is authentic.

Digital Fingerprint Generation Device

According to an embodiment, the present invention relates to a digital fingerprint generation device GD 20. Said digital fingerprint generation device GD 20 is configured to execute the previously described digital fingerprint generation method 100. Said digital fingerprint generation device GD 20 is advantageously configured to generate the digital signature $F_0$ 11 from an authentic visual item AVI 10, and preferably to store said digital fingerprint $F_0$ 11, advantageously in at least one of the forms previously discussed.

According to an embodiment, said digital signature generator device GD 20 comprises:

a. an optical unit OPT2 21 configured to acquire 110 at least one image I of the authentic visual item AVI 10 and/or a download unit configured to download at least one image I of the authentic visual item AVI 10 from a server: according to an embodiment said optical unit OPT2 21 can comprise a module configured to download at least one image I of the authentic visual item AVI 10; and b. a processing unit CPU2 22 configured to:

i. preferably generate 120 a corrected image Ic, preferably a spatially corrected image Ic by correcting the image I based on at least one spatial feature; and ii. extract 130 a plurality of features from said image I and/or said corrected image Ic; and iii. generate 140 the digital fingerprint $F_0$ 11 of the digital representation of the authentic visual item VI 10 using at least a portion of said extracted plurality of features; and c. preferably, a storage unit SU2 configured to store 150 the digital fingerprint $F_0$ 10 in at least one of the following forms: a QR code, a data matrix, a barcode, a serial number, a digital watermark, a metadata, data stored in a memory, for example of a smartcard, etc.; and d. preferably, a communication unit COM2 configured to send and/or receive data through at least one communication network; said communication unit COM2 is advantageously configured to send the stored digital fingerprint $F_0$ 11 to a server, preferably to a secured server allowing an authentication device AD 40 to download it if needed; and e. advantageously, a display unit configured to display at least the image I of the authentic visual item AVI 10 and/or to display the digital fingerprint $F_0$ 11 and/or the stored digital fingerprint $F_0$ 11, i.e. the digital fingerprint $F_0$ 11 in its stored form; and f. preferably, a power unit configured to power the digital fingerprint generation device GD 20.

According to an embodiment, the digital fingerprint generation device GD 20 can be a computer connected a scanner. In another embodiment, it can be a mobile device such as a smartphone for example.

Preferably, said digital fingerprint generation method 100 has several steps in common with the authentication method 200. In particular the steps that are different are mainly based on the fact that in the case of the generation of the stored digital fingerprint $F_0$ 11 the visual item considered is authentic and preferably the optical condition to acquire an image of this authentic visual item allow to have a high resolution digital representation of said authentic visual item, i.e. an image I with the highest quality score possible, whereas in the case of the generation of the digital fingerprint $F_t$ 45, the considered visual item VI 50 is maybe not authentic, and the conditions to acquire the images I are not perfect, resulting in a more advanced process to generate the digital fingerprint $F_t$ 45 that allows to compensate these conditions.

According to an embodiment, said processing unit CPU1 42 comprises at least one processor configured to execute at least one series of instructions, preferably stored by a memory. Said memory is preferably a non-transitory memory. Said memory advantageously stores a computer program as previously described.

First Example: Identity Card, Also Called ID Card

Figure 7:
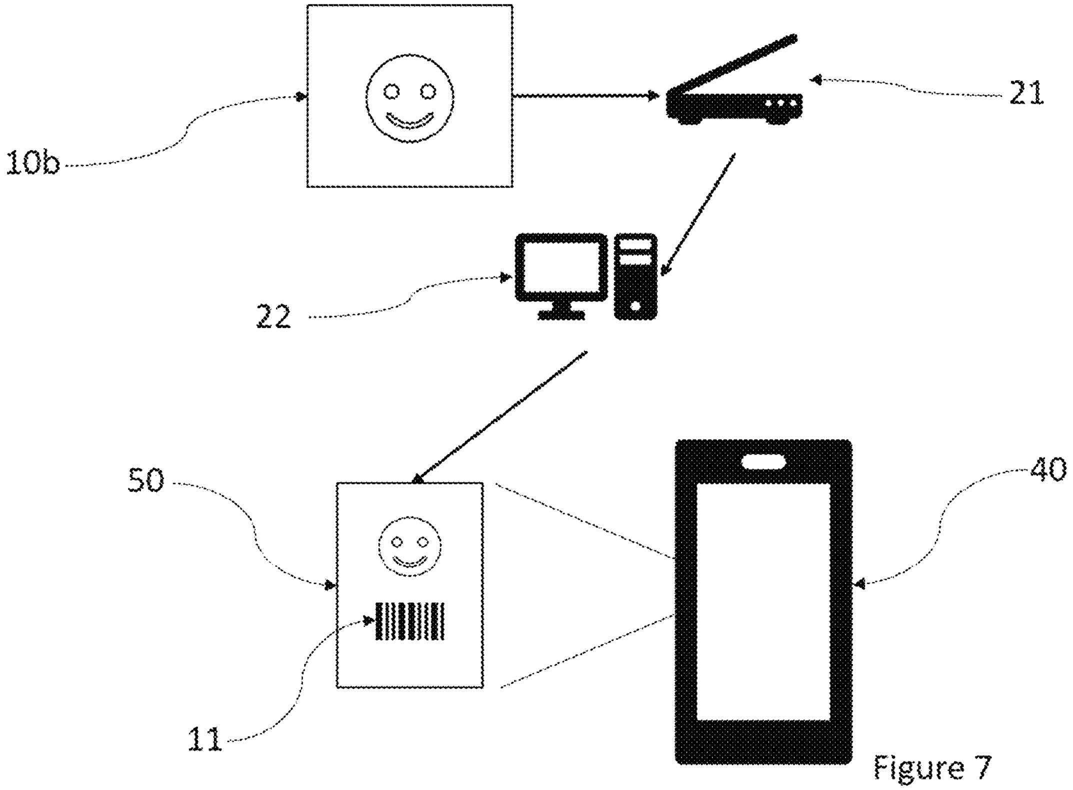
FIG. 7 is a schematic view of an example of implementation of the present invention.

According to a first example, and as illustrated by FIG. 7, the present invention can be implemented to allow a user to authenticate an ID card **10*b*** of a person.

According to an embodiment, this ID card **10*b* is issued by a government agency. To realize this ID card 10*b*, the future owner of this ID card 10*b* to be issued has to provide the official agency with a picture of himself. Said picture is considered to be authentic by the issuer of the ID card 10*b*. Said picture can be the visual item carried by said ID card 10*b***. According to an embodiment, said picture of the future owner can be a digital file, preferably downloaded or received in a digital form by the official agency.

The issuer uses the digital fingerprint generation method 100 to generate the digital fingerprint $F_0$ 11 associated to said picture. Then, said digital fingerprint $F_0$ 11 is preferably stored at least in a printed way on the ID card, for example using a barcode, a data matrix, a QR code and/or even a watermark, or a digital watermark, or a metadata, or data stored on a memory, etc. According to an embodiment, a watermark can comprise steganographic data, preferably encoding said stored digital fingerprint $F_0$ 11.

According to an embodiment, to use a steganographic process to store the digital fingerprint $F_0$ 11 inside at least a portion of a visual item, a predetermined area of said visual item can be chosen to store said digital fingerprint $F_0$ 11 in a steganographic form. Preferably, in this case, said stored digital fingerprint $F_0$ 11 is generated using another area than the predetermined area in order to avoid any perturbations due to the addition of the stored digital fingerprint $F_0$ 11 in its steganographic form inside the visual item. Therefore, the processing unit CPU1 42 can be configured to avoid considering said predetermined area to calculate a digital fingerprint $F_t$ 45. Preferably, said another area is considered by the processing unit CPU1 42 to generate said digital fingerprint $F_t$ 45 and said predetermined area is used to extract said stored digital fingerprint $F_0$ 11. Advantageously, a watermark can be used in a predetermined area configured to be avoided by the processing unit CPU1 42 to generate said digital fingerprint $F_t$ 45, and to be considered by the processing unit CPU1 42 to extract said stored digital fingerprint $F_0$ 11. For example, said predetermined area can be at least a part of the border, or of the contour, of the visual item.

According to another embodiment, the processing unit CPU1 42 can be configured to use an artificial intelligence algorithm A7 trained to identified steganographic data from a visual item. Preferably, said artificial intelligence algorithm A7 can be trained using a dataset comprising a plurality of visual items, a plurality of stored digital fingerprints $F_0$, each stored digital fingerprint $F_0$ of said plurality of stored digital fingerprint $F_0$ being associated to a visual item of said plurality of visual items, and a plurality of visual items comprising steganographic data. Each visual item comprising a steganographic data corresponds to a visual item of the plurality of visual items and each of these steganographic data encodes a stored digital fingerprint $F_0$ of the plurality of stored digital fingerprint $F_0$. Using said dataset, the artificial intelligence algorithm A7 is advantageously trained to extract from a given visual item comprising steganographic data, said steganographic data and to generate from said visual item a digital fingerprint $F_t$, preferably without considering said steganographic data for the generation of the digital fingerprint $F_t$. Said artificial intelligence algorithm A7 is preferably trained to generate a digital fingerprint $F_t$ from a visual item comprising its stored digital fingerprint $F_0$ encoding in steganographic data, said generated digital fingerprint $F_t$ being configured to correspond to said stored digital fingerprint $F_0$, i.e. to said steganographically encoding stored digital fingerprint $F_0$.

Therefore, the issuer uses a digital fingerprint generation device GD 20 such as a computer and a scanner, the computer being the processing unit CPU2 22 and the scanner being the optical unit OPT2 21. The issuer uses the scanner to acquire at least one image I of the picture of the future owner of the ID card. The processing unit CPU2 22 extracts from said image I at least a plurality of feature based on the previous discussed method. These features, in the form of a vector, are then used to generate a digital fingerprint $F_0$ 11 associated to the picture of the future owner, preferably intrinsically bounded to said picture. Indeed, any modification of the picture will generate a different digital fingerprint $F_0$ 11. Then, the ID card is printed and carries said image I as well as said digital fingerprint $F_0$ 11 which is now printed, i.e. stored on the ID card, for example in the form of a QR code.

Then, if a user wants to authenticate the picture of the owner of the ID card, he can use an authentication device AD 40 as previously described, such as his smartphone for example using a dedicated application. Using his smartphone, the user captures a plurality of images of the picture located on the ID card, preferably the user acquires in real time a video of this picture. According to an embodiment, for each frame acquired or at least for some of these acquired frames from said video, the authentication method 200 is applied in order to correct the images I generating the plurality of images Ic. Advantageously, this correction step is very useful. Indeed, for the generation of the stored digital fingerprint $F_0$ 11 the picture of the owner was steady and perfectly aligned with the lenses of the optical unit OPT2 21, in this case, this picture has been scanned using a scanner. Whereas, when the user is acquiring said plurality of images I, the position of the authentication device AD 40, his smartphone, regarding the position of the ID card cannot be perfect, there is some perspective issues that have to be corrected for example. Each image $I_t$ are therefore spatially corrected in order that the digital representation of the visual item VI 50, i.e. the picture of the owner of the ID card, is in a virtual plane parallel to the plane of the lenses of the optical unit OPT1 41, the camera of the smartphone of the user. Then for each corrected image $Ic_t$, preferably spatially corrected images $Ic_t$, the processing unit CPU1 42 of the smartphone extracts some features and generates a digital fingerprint $F_t$ 45 associated to the considered image $Ic_t$.

Based on this generated digital fingerprint $F_t$ 45, the processing unit CPU1 42, i.e. the smartphone of the user, estimates a distance metrics $D(Ic_t)$ between said generated digital fingerprint $F_t$ 45 and the stored digital fingerprint $F_0$ 11. Indeed, before or during the acquisition of the images $I_t$, the optical unit OPT1 41 acquires at least one image of the stored digital fingerprint $F_0$ 11, and the processing unit CPU1 42, if necessary, decodes the stored digital fingerprint $F_0$ 11 from this image $Ic_t$.

Then a first likelihood function $L(Ic_t|H)$ and a second likelihood function $L(Ic_t|G)$ are calculated as previously described. The first likelihood function relates $L(Ic_t|H)$ to the event that the picture, i.e. the visual item VI 50, is authentic and the second likelihood function $L(Ic_t|G)$ relates to the event that the picture, i.e. the visual item VI 50, is not authentic.

Then, as previously described, using these two likelihood functions, a probability P(H) that the visual item VI 50 illustrated in the image $Ic_t$ is authentic is computed based on a prior probability $P_0(H)$ and/or on a prior probability distribution $p_0(P(H)$.

Advantageously, for each new corrected image $Ic_t$ considered, the probability P(H) is updated.

Preferably, each image $Ic_t$ does not have the same weight, i.e. the same impact, regarding the update of the probability P(H). Indeed, as previously described, and according to a preferred embodiment, depending of the quality score of each corrected image $Ic_t$, its weight is not the same in the calculation of the average of the probability P(H). This allows to have a high consideration for corrected images $Ic_t$ with a better-quality score, for example higher than a predetermined threshold, and to have a low consideration for corrected images $Ic_t$ with a lower quality score, for example lower than a predetermined threshold.

Preferably, in real time, the user can see on the display of his smartphone the confirmation or the non-confirmation that the picture on the ID card is authentic or not.

According to an embodiment, the authentication method 200 can comprise a step of guiding the user to move in the space the authentication device AD 40 in order to increase the quality of the images I 44 acquired by the optical unit OPT1 41. For example, the authentication device Ad 40 can notify to the user to move the optical unit OPT1 41 closer to the visual item VI 50 and/or to move the optical unit OPT1 41 farther from the visual item VI 50. For another example, the authentication device AD 40 can notify to the user to rotate the optical unit OPT1 41 regarding to the visual item VI 50 to reduce or avoid some perspective mismatch or defect or error for example. For another example, the authentication device AD 40 can notify to the user that the conditions of light are insufficient to correctly capture the images I 44 of the visual item VI 50.

According to an embodiment, after a predetermined number of corrected images $Ic_t$ and/or after a predetermined time t of acquisition of images.

a. if the probability P(H) is lower than a predetermined threshold, the processing unit notify to the user that the visual item VI 50 is not authentic, and b. if the probability P(H) is higher than a predetermined threshold, the processing unit confirm to the user that the visual item VI 50 is authentic.

Second Example: Value Document

Figure 8:
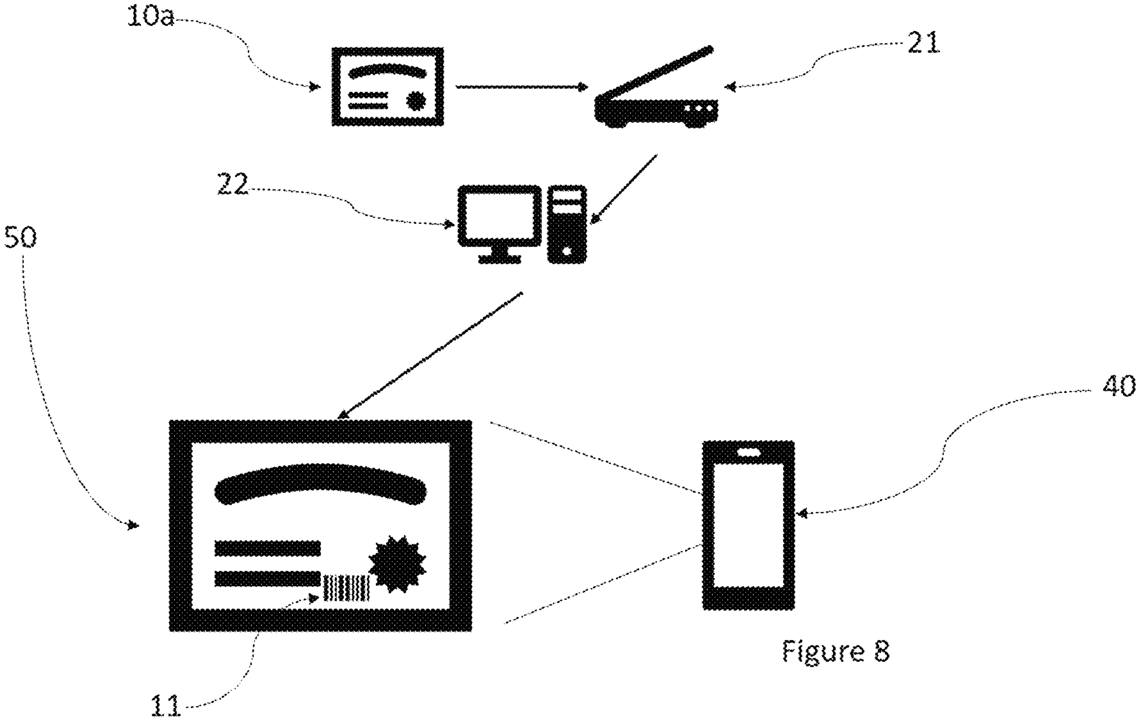
FIG. 8 is a schematic view of another example of implementation of the present invention.

According to an embodiment, and as illustrated in FIG. 8, the visual item VI 50 can be carried by a value document 10*a* such as a diploma for example According to this use case, the visual item VI 50 can be a part or even the whole value document, depending of the use case.

As for the ID card, the value document is considered as authentic by the issuer of said value document, such as a diploma for example. Said issuer scans it, and/or download it from a server in a digital form, and generate a digital fingerprint $F_0$ 11 from it or at least from a portion of it. Said digital fingerprint can be printed $F_0$ 11 on a dedicated place of the diploma, for example on the contour or on the back, or even on a region designed to be avoid by the authentication device AD 40 for the generation 240 of the fingerprint $F_t$ 45 for example. According to an embodiment, the digital fingerprint $F_0$ 11 can be stored in a server and the diploma can comprise a QR code for example allowing the authentication device AD 40 to download said digital fingerprint $F_0$ 11 from said server during the authentication method 200. This allows for example the whole value document to be considered to generate the digital fingerprint $F_t$ 45.

As previously, the authentication method 200 comprises the acquisition of a plurality of images It, the generation of a digital fingerprint $F_t$ 45 for each of the corrected images $Ic_t$, preferably if its quality score is higher than a predetermined threshold, and the notification to the user if the visual item VI 50, i.e. the value document in this case, is authentic or not.

Third example: Painting

Figure 9:
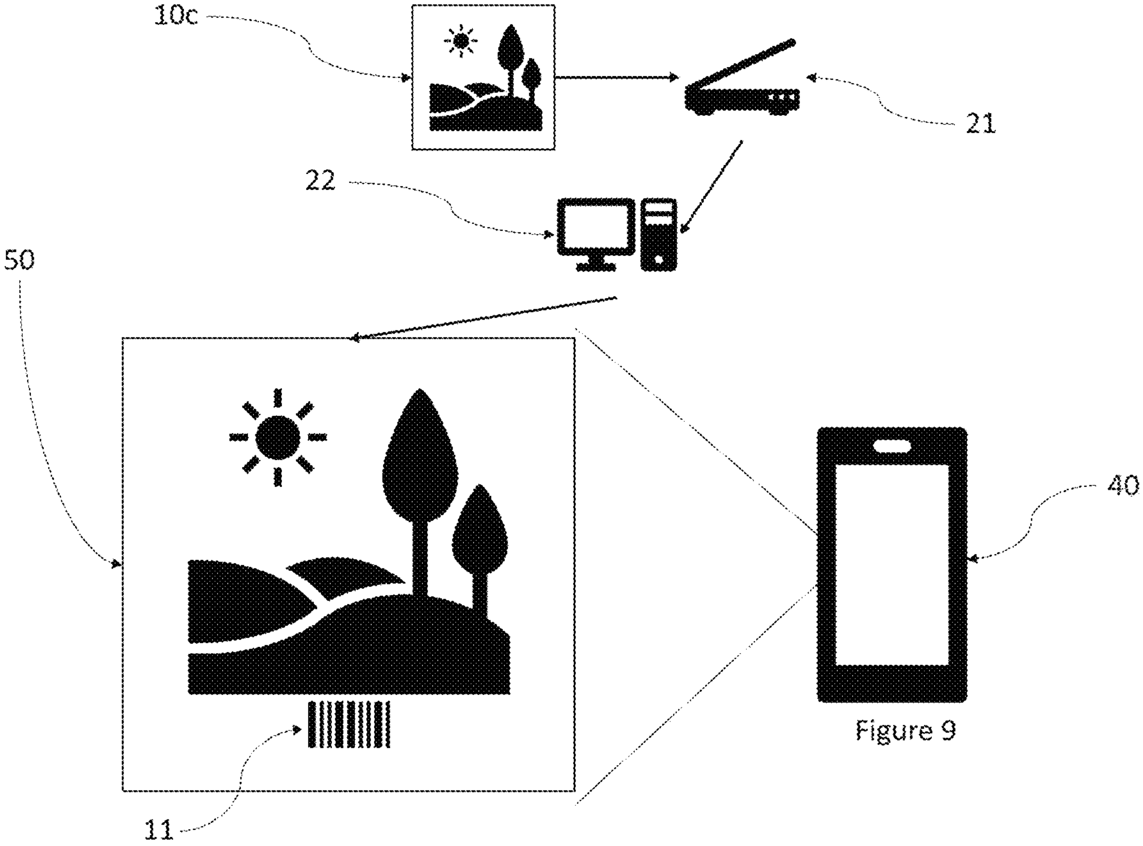
FIG. 9 is a schematic view of another example of implementation of the present invention.

According to a third example, and as illustrated by FIG. 9, the present invention can be implemented in the art field, for example for the authentication of paintings.

According to an embodiment, a painting 10*c* or at least a part of a painting can be a visual item VI 50 regarding the present invention.

Therefore, an authority can generate a stored digital fingerprint $F_0$ 11 from a painting, or at least from a portion of a painting. Then, this stored digital fingerprint $F_0$ 11 can be stored in a server or located near the painting, on the contour, the border, the frame or even on the back of the painting.

According to an embodiment, the optical unit OPT2 21 of the digital fingerprint generation device GD 20 can be a three-dimensional scanner and/or camera configured to acquire the relief of the painting, preferably as well as its image. According to an embodiment, the stored digital fingerprint $F_0$ 11 can then be generated using three-dimensional discrete cosines transforms to extract a plurality of features vectors forming the stored digital fingerprint $F_0$ 11 as previously described.

According to an embodiment, the authentication method can be executed by an authentication device, as previously described, wherein the optical unit OPT1 41 is a three-dimensional scanner and/or camera, and/or wherein the optical unit OPT1 41 is a bi-dimensional scanner and/or camera.

Fourth Example: Collectible Cards

According to a fourth example, and as illustrated in FIG. 10, the present invention can be implemented in the collectible items' fields, such as for example collectible cards.

According to said embodiment, it has to be noticed that the visual item can be more than just a picture, it can be a text and/or a picture and a text. Indeed, a visual item is simply an optical element that allow an optical unit to acquire at least one picture of it.

Therefore, according to said example, the visual item can be a collectible card 10*d*, or at least a portion of it allowing the rest of the card to carry the stored digital fingerprint $F_0$ 11 in a printed form for example According to said example, the issuer of the card 10*d* acquires an image of it using a scanner for example, or downloading it from a server for example, and then generate a digital fingerprint $F_0$ 11 that is stored on the card and/or in a server, as previously described.

The user that wants to authenticate a collectible card, uses then its smartphone for example as the authentication device AD 40, and acquire a plurality of images I of the collectible card, preferably through a real time video, and the processing unit CPU1 42 of the smartphone generate for each considered images $Ic_t$ a digital fingerprint $F_t$ 45 that is compared with the stored digital fingerprint $F_0$ 11 using the distance metrics $D(Ic_t)$, this allows to calculate the first and the second likelihood functions that update a probability P(H) that the collectible card is authentic.

Fifth Example: NFT Authenticity

According to a fifth example, the present invention can be implemented in the field of the Non-Fungible Tokens, also called NFTs, regarding the art domain for example. Indeed, according to said example, if the NFT is a picture or even a three-dimensional object, the present invention can be applied to generate a stored digital fingerprint $F_0$ 11 of an authentic visual item represented by an NFT. Then the present invention can be implemented to authenticate if the visual item represented by an NFT is authentic or not. Indeed, based on the NFT process, an NFT is always authentic but the visual item, 2D or 3D, that is represented by said NFT can be not authentic.

A NFT is simply a smart contract associated with a digital item. Said digital item can be a visual item such as a picture, a video or even a three-dimensional object.

The present invention can be used to generate the stored digital fingerprint $F_0$ 11 of a visual item represented by an NFT to allow a user to authenticate that said NFT is related to a visual item that is authentic. In this case, the medium carrying said visual item can be a digital screen, the screen of a smartphone, the screen of a computer, the screen of a tablet, etc.

According to an embodiment, the stored digital fingerprint $F_0$ can be stored in the metadata of an NFT. Usually, an NFT comprises metadata, for example comprising a link to a server wherein the visual item represented by the NFT is stored. Having the stored digital fingerprint $F_0$ in the metadata of an NFT allows a user to authenticate the visual item represented by an NFT without the need to access to the authentic visual item stored in a server. According to said embodiment, the stored digital fingerprint $F_0$ can be used as a compressed version of the visual item represented by the NFT is case for example wherein the link to the server, where the visual item represented by the NFT is stored, is not anymore active and/or alive; i.e. is dead The user can use here again his smartphone as an authentication device AD 40 to execute the authentication method 200 to determine if the displayed visual item is authentic or not.

Sixth Example: Video Authenticity

According to another example, the present invention can be applied to a video. Indeed, a video comprises a plurality of frame, each of these frames can be or can comprise a visual item, therefore the present invention can be used to authenticate a video, or at least a portion of a video.

For example, each frame of the video can be authenticated.

According to another embodiment, only some of the frames of the video are used according to the present invention to authenticate the whole video.

According to another embodiment, a stored digital fingerprint is generated for the whole video based on a plurality of sub-stored digital fingerprints regarding each or some of the frames of the video.

According to an embodiment, the authentication method 200 can be applied to a plurality of frames from a video. Each frame considered can therefore allow the authentication device to compute the probability P(H) that the video is authentic.

As previously described, the present invention can be applied to a wide range of use cases. These described examples are not a limitation of the present invention.

The invention is not limited to the embodiments described above and extends to all the embodiments covered by the claims.

REFERENCES

10 Authentic visual item
**10*a*** Value document
**10*b*** ID card
**10*c*** Painting
**10*d*** Collectible card
11 Stored digital fingerprint
12 Medium carrying the authentic visual item
20 Digital signature generator device
21 Optical unit of the enrolment device
22 Processing unit of the enrolment device
23 Screen of the enrolment device
24 Image of the authentic visual item
25 Generated digital fingerprint
26 Stored digital fingerprint
30 Authentic visual item with its stored digital fingerprint
40 Authenticating device
41 Optical unit of the authenticating device
42 Processing unit of the authenticating device
43 Screen of the authenticating device
44 Plurality of images of the visual item
45 Generating digital fingerprint
46 Extracted digital fingerprint
50 Visual item to be authenticated
51 Medium carrying the visual item to be authenticated
100 Enrolment method
110 Acquiring at least one image of the authentic visual item
120 Generating a spatially corrected image
130 Extracting a plurality of features
140 Generating a digital fingerprint
150 Storing the digital fingerprint
200 Authenticating method
210 Acquiring a plurality of images of a visual item
220 Generating a spatially corrected image
230 Extracting a plurality of features
240 Generating a digital fingerprint
250 Calculating at least one distance metric D
260 Calculating a first likelihood function $L(Ic_t|H)$ of authenticity H of the visual item VI and a second likelihood function $L(Ic_t|G)$ of non-authenticity G of the visual item VI
270 Computing a probability P(H) that the visual item VI is authentic
280 Confirming that the visual item VI is authentic

The invention claimed is:

1. A method for authenticating a visual item VI using a stored digital fingerprint $F_0$ and an authentication device AD, said authentication device AD comprising at least one optical unit OPT1 and at least one processing unit CPU1, said stored digital fingerprint $F_0$ being previously generated from an authentic visual item AVI (10), said method comprising the following steps:

a) acquiring, using said optical unit OPT1, at least a plurality of images I of an area comprising the visual item VI to be authenticated, said optical unit OPT1 being in communication with said processing unit CPU1, each image $I_t$ of the plurality of images I comprising at least partially one digital representation of said visual item VI, the image $I_t$ being acquired at a time t; and b) for each image $I_t$ of the plurality of images I, generating, by said processing unit CPU1, a spatially corrected image $Ic_t$ by correcting the image $I_t$ based on at least one spatial feature to calibrate the at least partially one digital representation of said visual item VI to be in a same perspective as that of said authentic visual item AVI, creating a plurality of spatially corrected images Ic; and c) for each spatially corrected image $Ic_t$ of the plurality of spatially corrected images Ic:

i) extracting, by said processing unit CPU1, a plurality of features; and ii) generating, by said processing unit CPU1, a digital fingerprint $F_t$ of the digital representation of the visual item VI from the spatially corrected image $Ic_t$ using at least a portion of said extracted plurality of features; and iii) calculating, by said processing unit CPU1, at least one distance metric $D(Ic_t)$ between said digital fingerprint $F_t$ and said stored digital fingerprint $F_0$; and iv) calculating, by said processing unit CPU1, a first likelihood function $L(Ic_t|H)$ of authenticity H of the visual item VI from its digital representation from the spatially corrected image $Ic_t$ based on said calculated distance metric $D(Ic_t)$ and a second likelihood function $L(Ic_t|G)$ of non-authenticity G of the visual item VI from its digital representation from the spatially corrected image $Ic_t$ based on said calculated distance metric $D(Ic_t)$; and v) computing, by said processing unit CPU1, a probability P(H) that the visual item VI is authentic using the first likelihood function $L(Ic_t|H)$ and the second likelihood function $L(Ic_t|G)$; and wherein the probability P(H) is updated as each spatially corrected image $Ic_t$ of the plurality of spatially corrected images is processed, and the authentication of the visual item VI is confirmed, by said processing unit CPU1, if the probability P(H) is greater than a predetermined threshold.

2. The method according to claim 1 wherein the computing step of the probability P(H) comprises the following steps:

a) setting, by the processing unit CPU1, a prior probability $P_0(H)$ based on a predetermined set of rules, and b) for each spatially corrected image $Ic_t$, calculating, by the processing unit CPU1, a posterior probability Pt (H) as follow:

$$P_t(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

and c) calculating, by the processing unit CPU1, the probability P(H) by computing a weighted moving average as follow:

$$P(H) = \frac{\sum_{i=0}^{w} \gamma_i P_{t-i}(H)}{\sum_{i=0}^{w} \gamma_i}$$

wherein w is the number of spatially corrected image $Ic_t$ of the plurality of spatially corrected image Ic and $\{\gamma_i\}$ (t=0, . . . w) are predetermined weights.

3. The method according to claim 2, wherein the predetermined set of rules are established based on an artificial intelligence algorithm A4 configured to generate a prior probability $P_0(H)$ based on at least one of these parameters:

a) a reputation score based on the nature of the visual item, and/or the location of the visual item and/or on metadata related to the visual item and/or an issuer of the visual item and/or an issuer of a medium carrying the visual item, a uniform law of distribution;

and/or based on at least one of the following processes:

b) a decision tree; and c) forests consisting of decision trees.

4. The method according to claim 1 wherein the probability P(H) is computed from a probability distribution p(P(H)) and wherein P(H) is related to at least one descriptive statistics of the probability distribution p(P(H)), and wherein P(H) is a mathematical expectation of p(P(H)) as follow:

$$P(H) = \int_0^1 p(y) y \, dy$$

wherein the computing step of the probability P(H) comprises the following steps:

a) setting, by the processing unit CPU1, a prior probability distribution $p_0(P(H))$ based on a predetermined set of rules, and b) sampling, by the processing unit CPU1, K independent prior probability values $\{P_{0,1}, \ldots, P_{0,K}\}$ from the prior probability distribution $p_0(P(H))$; and c) using each of these K prior probabilities $\{P_{0,k}\}_{k=1 \ldots K}$, calculating, by the processing unit CPU1, K posterior probabilities $\{P_{t,k}(H)\}_{k=1 \ldots K}$ as follow:

$$P_{t,k}(H) = \frac{L(Ic_t \mid H)P_0(H)}{P(Ic_t)} = \frac{L(Ic_t \mid H)P_0(H)}{L(Ic_t \mid H)P_0(H) + L(Ic_t \mid G)(1 - P_0(H))}$$

and d) using the K posterior probabilities $\{P_{t,k}(H)\}_{k=1 \ldots K}$, fitting, by the processing unit CPU1, a new posterior probability distribution $p_t(P(H))$, and e) calculating, by the processing unit CPU1, the probability distribution p(P(H)) by computing a weighted moving average as follow:

$$p(P(H)) = \frac{\sum_{i=0}^{w} \alpha_i p_{t-i}(P(H))}{\sum_{i=0}^{w} \alpha_i}$$

wherein w is the number of spatially corrected image Ict of the plurality of spatially corrected image Ic and $\{\alpha_i\}$ (i=0, . . . w) are predetermined weights.

5. The method according to claim 4, wherein the calculating step of the first likelihood function $L(Ic_t|H)$ based on the distance metric $D(Ic_t)$ comprises the following steps:

a) fitting, by the processing unit CPU1, a probability distribution PD1 with respect to a distance metric D(PD1) from at least one set of training data SD1, said training data SD1 corresponding to authentic visual items; and b) for each image $Ic_t$, calculating, by the processing unit CPU1, the first likelihood function $L(Ic_t|H)$ as a probability given by PD1 at the distance metric $D(Ic_t)$;

and, wherein the calculating step of the second likelihood function $L(Ic_t|G)$ based on the distance metric $D(Ic_t)$ comprises the following steps:

c) fitting, by the processing unit CPU1, a probability distribution PD2 with respect to a distance metric D(PD2) from at least one set of training data SD2, said training data SD2 corresponding to non-authentic visual items; and d) for each image $Ic_t$, calculating, by the processing unit CPU1, the second likelihood function $L(Ic_t|G)$ as a probability given by PD2 at the distance metric $D(Ic_t)$.

6. The method according to claim 4, wherein the predetermined set of rules are established based on an artificial intelligence algorithm A4 configured to generate a prior probability distribution $p_0(P(H))$ based on at least one of these parameters:

a) a reputation score based on the nature of the visual item, and/or the location of the visual item and/or on metadata related to the visual item and/or an issuer of the visual item and/or an issuer of a medium carrying the visual item, a uniform law of distribution;

and/or based on at least one of the following processes:

b) a decision tree; and c) forests consisting of decision trees.

7. The method according to claim 1, wherein the calculating step (260) of the first likelihood function $L(Ic_t|H)$ based on the distance metric $D(Ic_t)$ comprises the following steps:

a) fitting, by the processing unit CPU1, a probability distribution PD1 of a distance metric D(SD1) from at least one set of training data SD1, said training data SD1 corresponding to authentic visual items; and b) for each image $Ic_t$, calculating, by the processing unit CPU1, the first likelihood function $L(Ic_t|H)$ as the probability given by PD1 at the distance metric $D(Ic_t)$;

and, wherein the calculating step of the second likelihood function $L(Ic_t|G)$ based on the distance metric $D(Ic_t)$ comprises the following steps:

c) fitting, by the processing unit CPU1, a probability distribution PD2 of a distance metric D(SD2) from at least one set of training data SD2, said training data SD2 corresponding to non-authentic visual items; and d) for each image $Ic_t$, calculating, by the processing unit CPU1, the second likelihood function $L(Ic_t|G)$ as the probability given by PD2 at the distance metric $D(Ic_t)$.

8. The method according to claim 1, wherein the first likelihood function $L(Ic_t|H)$ is at least partially generated by an artificial intelligence algorithm A1 using at least one set of training data SD1, said first likelihood function $L(Ic_t|H)$ comprising at least a sub-function SF1 defined by a density of probabilities that the visual item VI is authentic, said sub-function SF1 being generated by the artificial intelligence algorithm A1 using said training data SD1, said training data SD1 corresponding to authentic visual items, said first sub-function SF1 corresponding to a mathematical model of authentic visual items;

and wherein the second likelihood function $L(Ic_t|G)$ is at least partially generated by an artificial intelligence algorithm A1' using at least one set of training data SD2, said second likelihood function $L(Ic_t|G)$ comprising at least a sub-function SF2 defined by a density of probabilities that the visual item VI is non-authentic, said sub-function SF2 being generated by the artificial intelligence algorithm A1' using said training data SD2, said training data SD2 corresponding to non-authentic visual items, said sub-function SF2 corresponding to a mathematical model of non-authentic visual items.

9. The method according to claim 1, wherein the visual item VI is carried by a medium ME and wherein the first likelihood function $L(Ic_t|H)$ is at least partially generated using an artificial intelligence algorithm A2 configured to generate at least one linear combination of mathematical models of media for each spatially corrected image $Ic_t$ based on at least a plurality of mathematical models of media, and wherein the second likelihood function $L(Ic_t|G)$ is at least partially generated using an artificial intelligence algorithm A2' configured to generate at least one linear combination of mathematical models of media for each spatially corrected image $Ic_t$ based on at least a plurality of mathematical models of media.

10. The method according to claim 9 wherein the artificial intelligence algorithms A2 and A2' comprise the following steps:

a) extracting, by the processing unit CPU1, local binary patterns feature vectors at pixels among a plurality of pixels of each spatially corrected image $Ic_t$ of the plurality of spatially corrected images Ic; and b) calculating, by the processing unit CPU1, the histogram of the local binary patterns features vectors throughout at least a portion of each spatially corrected image $Ic_t$ of the plurality of spatially corrected images Ic; and c) training, by the processing unit CPU1, a classifier which outputs the medium from the local binary patterns feature vectors based on a plurality of mathematical models of media; and d) using said classifier, generating, by the processing unit CPU1, at least one probability for each mathematical model of media of the plurality of mathematical models for each spatially corrected image $Ic_t$ of the plurality of spatially corrected images Ic that the visual item VI is carried by a certain kind of media; and e) generating, by the processing unit CPU1, at least one linear combination of mathematical models of said media for the spatially corrected image $Ic_t$.

11. The method according to claim 1, comprising, before the step of extracting the plurality of features from a spatially corrected image $Ic_t$ of the plurality of spatially corrected images $Ic_t$, a step of calculating, by the processing unit CPU1, a quality score of each image $Ic_t$ of the plurality of spatially corrected images Ic, and wherein only if said quality score is higher than a predetermined threshold, the step of extracting from said image $Ic_t$ the plurality of features is executed.

12. The method according to claim 1, wherein the distance metric $D(Ic_t)$ is calculated using a matrix Q as a mathematical operator between the stored digital fingerprint $F_0$ and the digital fingerprint $F_t$, said matrix Q is generated using an artificial intelligence algorithm A3, said artificial intelligence algorithm A3 is configured to generate said matrix Q based on at least two sets of training data SD3 and SD4 such that:

a) the matrix Q maximizes the distance metric $D(Ic_t)$ using said training data SD3, said training data SD3 corresponding to authentic visual items; and b) the matrix Q minimizes the distance metric $D(Ic_t)$ using said training data SD4, said training data SD4 corresponding to non-authentic visual items.

13. The method according to claim 1, wherein the distance metric $D(Ic_t)$ is calculated using a matrix Q as a mathematical operator between the stored digital fingerprint $F_0$ and the digital fingerprint $F_t$, said matrix Q is generated using an artificial intelligence algorithm A3, said artificial intelligence algorithm A3 is configured to generate said matrix Q based on at least two sets of training data SD3 and SD4 such that:

a) the matrix Q maximizes the distance metric $D(Ic_t)$ using said training data SD3, said training data SD3 corresponding to authentic visual items; and b) the matrix Q minimizes the distance metric $D(Ic_t)$ using said training data SD4, said training data SD4 corresponding to non-authentic visual items, wherein the stored digital fingerprint $F_0$ comprises a vector $V_0$ comprising a predetermined number N of elements, and wherein the digital fingerprint $F_t$ comprises a vector Vt comprising a number M of elements, and wherein $M \leq N$ and wherein M is a function of the quality score of the spatially corrected image $Ic_t$.

14. An authentication device AD configured to authenticate a visual item VI using a stored digital fingerprint $F_0$, said stored digital signature $F_0$ being previously generated from an authentic visual item VI, said authentication device AD comprising:

a) an optical unit OPT1 configured to acquire at least a plurality of images I of an area comprising the visual item VI to be authenticated, each image $I_t$ of the plurality of images I comprising at least partially one digital representation of said visual item VI, the image $I_t$ being acquired at a time t; and b) a processing unit CPU1 configured to:

i) for each image $I_t$ of the plurality of images I, generate a spatially corrected image $Ic_t$ by correcting the image $I_t$ based on at least one spatial feature to calibrate the at least partially one digital representation of said visual item VI to be in a same perspective as that of said authentic visual item AVI, creating a plurality of spatially corrected images Ic; and ii) for each spatially corrected image $Ic_t$ of the plurality of spatially corrected images Ic:

(1) extract a plurality of features; and (2) generate a digital fingerprint $F_t$ of the digital representation of the visual item VI from the spatially corrected image $Ic_t$ using at least a portion of said extracted plurality of features; and (3) calculate at least one distance metric $D(Ic_t)$ between said digital fingerprint $F_t$ and said stored digital fingerprint $F_0$; and (4) calculate a first likelihood function $L(Ic_t|H)$ of authenticity H of the visual item VI from its digital representation from the spatially corrected image $Ic_t$ based on said calculated distance metric $D(Ic_t)$ and a second likelihood function $L(Ic_t|G)$ of non-authenticity G of the visual item VI from its digital representation from the spatially corrected image $Ic_t$ based on said calculated distance metric $D(Ic_t)$; and (5) compute a probability P(H) that the visual item VI is authentic using the first likelihood function $L(Ic_t|H)$ and the second likelihood function $L(Ic_t|G)$, the probability P(H) being updated as each spatially corrected image $Ic_t$ of the plurality of spatially corrected images is processed; and (6) confirm that the visual item VI is authentic if the probability P(H) is greater than a predetermined threshold.

* * * * *